(12) United States Patent
Cheng et al.

(10) Patent No.: US 11,493,727 B2
(45) Date of Patent: Nov. 8, 2022

(54) OPTICAL SYSTEM

(71) Applicant: TDK TAIWAN CORP., Taoyuan (TW)

(72) Inventors: Yi-Chun Cheng, Taoyuan (TW);
Chao-Chang Hu, Taoyuan (TW);
Che-Wei Chang, Taoyuan (TW);
Chih-Wen Chiang, Taoyuan (TW);
Tsung-Tung Li, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 487 days.

(21) Appl. No.: 16/728,816

(22) Filed: Dec. 27, 2019

(65) Prior Publication Data

US 2020/0209515 A1 Jul. 2, 2020

Related U.S. Application Data

(60) Provisional application No. 62/785,593, filed on Dec. 27, 2018.

(30) Foreign Application Priority Data

Dec. 20, 2019 (EP) .................................... 19218902

(51) Int. Cl.
| | | |
|---|---|---|
| *G02B 7/09* | (2021.01) | |
| *G02B 27/64* | (2006.01) | |
| *G03B 5/00* | (2021.01) | |
| *G03B 13/36* | (2021.01) | |
| *G02B 3/12* | (2006.01) | |
| *G02B 26/00* | (2006.01) | |
| *G02B 7/182* | (2021.01) | |
| *G02B 7/02* | (2021.01) | |
| *H04N 5/225* | (2006.01) | |
| *H04N 5/232* | (2006.01) | |

(Continued)

(52) U.S. Cl.
CPC ................. *G02B 7/09* (2013.01); *G02B 3/12* (2013.01); *G02B 7/023* (2013.01); *G02B 7/1828* (2013.01); *G02B 26/004* (2013.01); *G02B 27/646* (2013.01); *G03B 3/10* (2013.01); *G03B 5/00* (2013.01); *G03B 5/02* (2013.01); *G03B 13/36* (2013.01); *H04N 5/2257* (2013.01); *H04N 5/23258* (2013.01); *H04N 5/23287* (2013.01); *G03B 2205/0007* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

| 9,134,503 B2 * | 9/2015 | Topliss ..................... G03B 5/00 |
|---|---|---|
| 2011/0122495 A1 * | 5/2011 | Togashi ................... G02B 7/08 359/557 |

(Continued)

*Primary Examiner* — Rodney E Fuller
(74) *Attorney, Agent, or Firm* — Muncy, Geissler, Olds & Lowe, P.C.

(57) ABSTRACT

An optical system is provided, including a fixed assembly, a plurality of movable members, and a plurality of driving assemblies respectively connected to the movable members. The movable members are connected to an optical element and movable relative to the fixed assembly. The driving assemblies respectively drive the movable members to move relative to the fixed assembly in different time intervals.

20 Claims, 33 Drawing Sheets

(51) Int. Cl.
  *G03B 5/02* (2021.01)
  *G03B 3/10* (2021.01)

(56) References Cited

U.S. PATENT DOCUMENTS

2020/0209439 A1* 7/2020 Hu .................. G02B 27/646
2020/0213493 A1* 7/2020 Cheng ............... G02B 27/646
2021/0018714 A1* 1/2021 Park ................. G02B 7/09

* cited by examiner

OPTICAL SYSTEM

CROSS REFERENCE TO RELATED APPLICATIONS

This application claims the benefit of U.S. Provisional Application No. 62/785,593, filed Dec. 27, 2018, and European Patent Application No. 19218902.5, filed Dec. 20, 2019, the entirety of which are incorporated by reference herein.

BACKGROUND OF THE INVENTION

Field of the Invention

The present disclosure relates to an optical system, and in particular it relates to an optical system having a liquid lens.

Description of the Related Art

As technology has progressed, many kinds of electronic devices such as smartphones have begun to include the functionality of digital photography or video recording. A user can operate the electronic device to capture various images with a camera module that is included in the electronic device.

Today's design of electronic devices continues to move toward the trend of miniaturization so that the various components of the camera module or its structure must also be continuously reduced, so as to achieve the purpose of miniaturization. In general, a driving mechanism of the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of miniaturization.

Therefore, how to design a camera module that can perform autofocus, optical image stabilization, and miniaturization at the same time is a topic nowadays that needs to be discussed and solved.

BRIEF SUMMARY OF INVENTION

In view of the aforementioned problems, the object of the invention is to provide an optical system that includes a fixed assembly, a plurality of movable members, and a plurality of driving assemblies respectively connected to the movable members. The movable members are connected to an optical element and movable relative to the fixed assembly. The driving assemblies respectively drive the movable members to move relative to the fixed assembly in different time intervals.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

The First Embodiment Group

Figure 1:
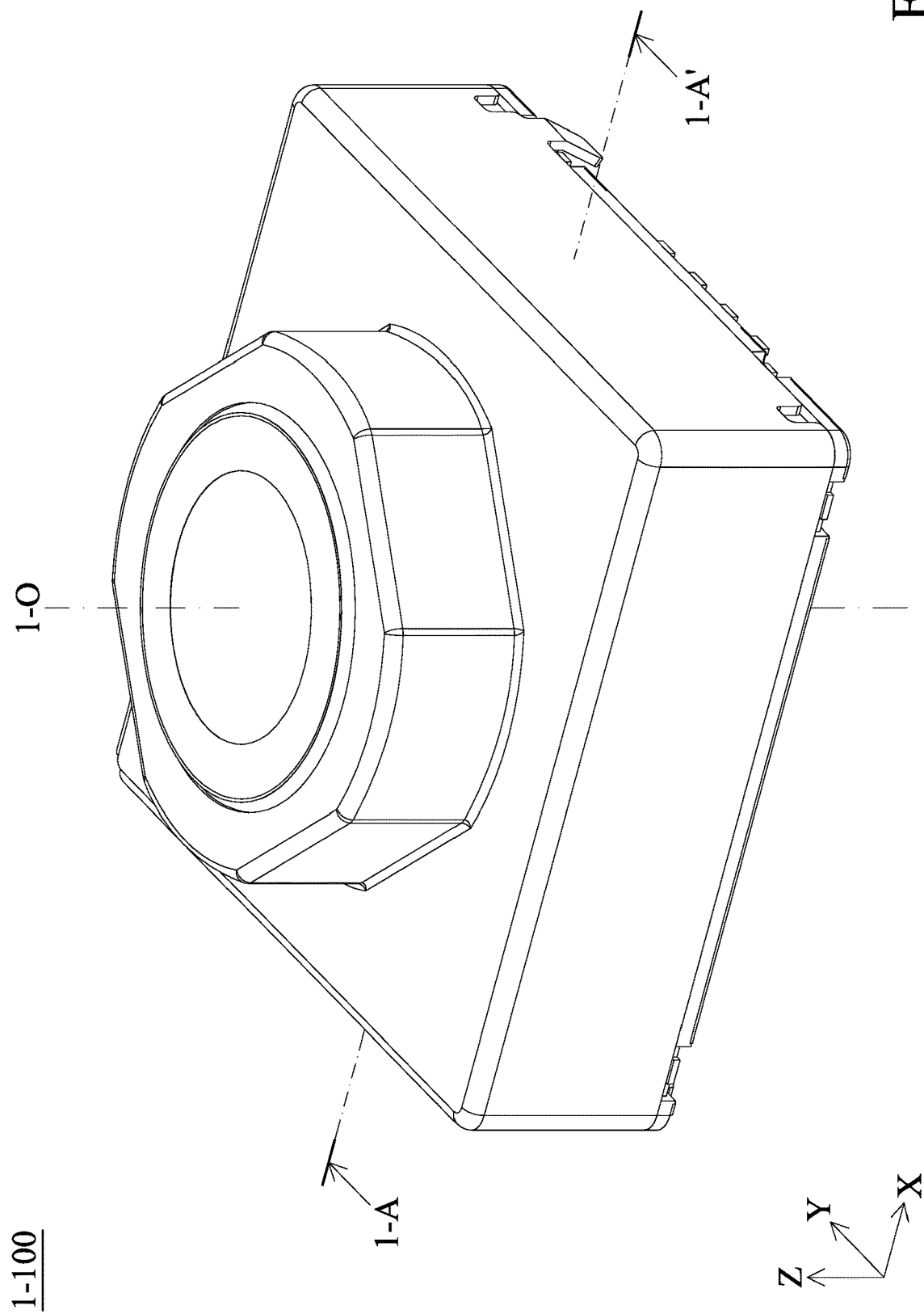
FIG. 1 is a schematic diagram of an optical system 1-100 according to an embodiment of the present disclosure.
Figure 2:
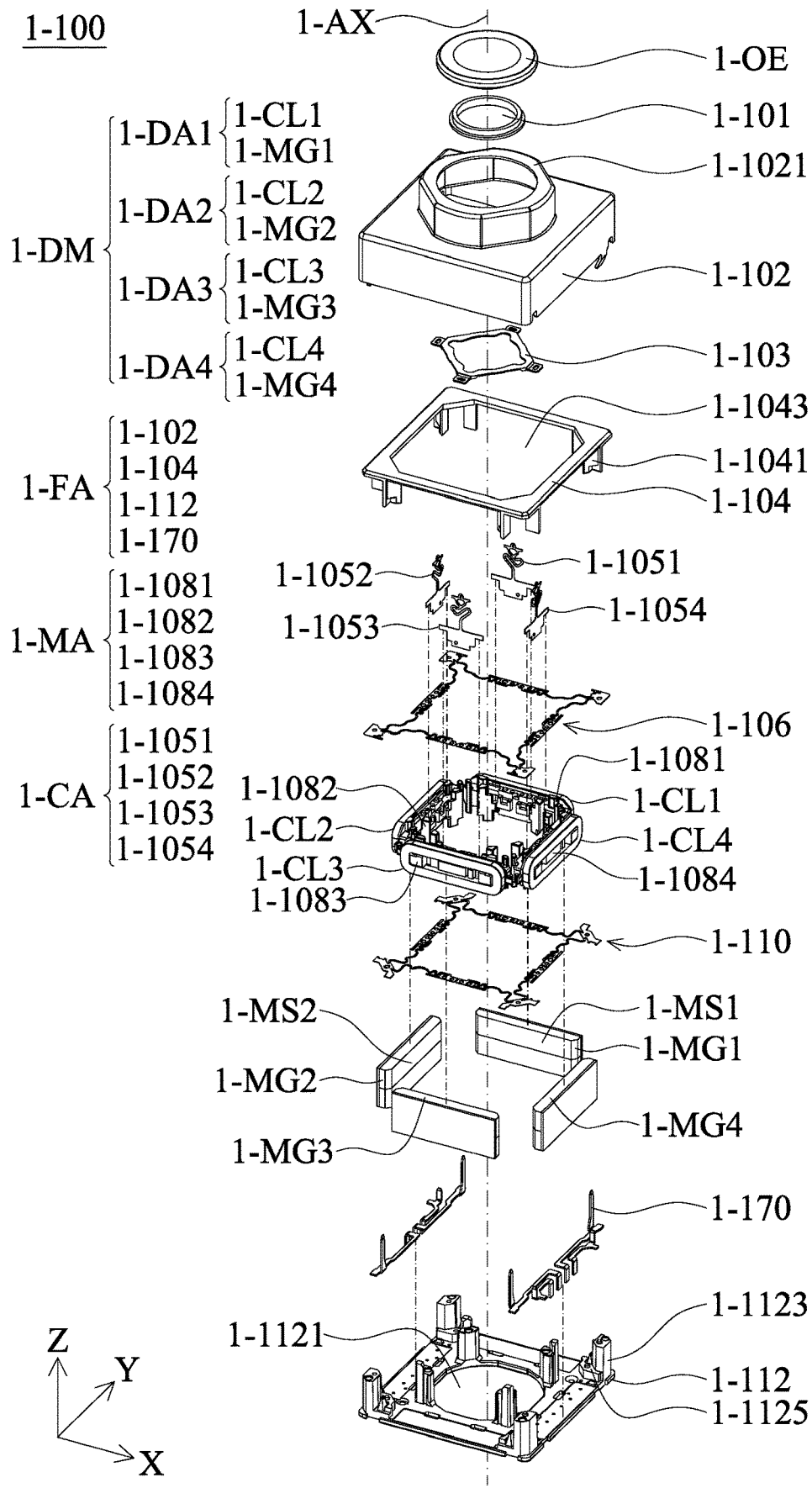
FIG. 2 is an exploded diagram of an optical system 1-100 according to an embodiment of the present disclosure.
Figure 3:
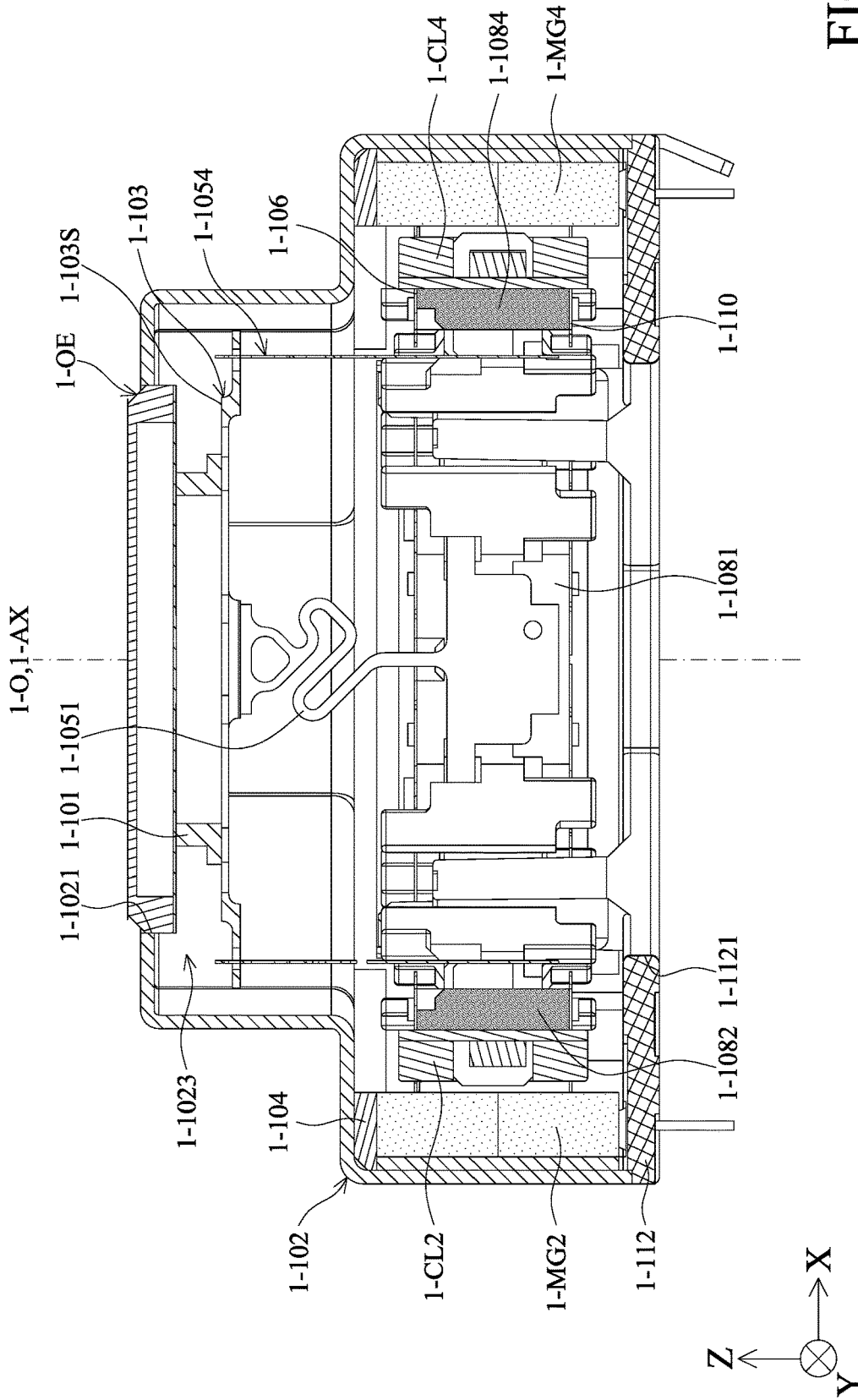
FIG. 3 is a cross-sectional view of the optical system 1-100 along line 1-A-1-A' in FIG. 1 according to an embodiment of the present disclosure.

Please refer to FIG. 1 to FIG. 3. FIG. 1 is a schematic diagram of an optical system 1-100 according to an embodiment of the present disclosure, FIG. 2 is an exploded diagram of an optical system 1-100 according to an embodiment of the present disclosure, and FIG. 3 is a cross-sectional view of the optical system 1-100 along line 1-A-1-A' in FIG. 1 according to an embodiment of the present disclosure. The optical system 1-100 can be an optical camera system and can be configured to hold and drive a first optical element 1-OE, and the first optical element 1-OE may define an optical axis 1-O. The optical system 1-100 can be installed in different electronic devices or portable electronic devices, such as a smartphone, for allowing a user to perform the image capturing function. In this embodiment, the optical system 1-100 can be a voice coil motor (VCM) with an auto-focusing (AF) function, but it is not limited thereto. In other embodiments, the optical system 1-100 can also perform the functions of auto-focusing and optical image stabilization (OIS).

As shown in FIG. 2, in this embodiment, the optical system 1-100 may include a fixed assembly 1-FA, a deforming member 1-101, a movable element 1-103, and a connecting assembly 1-CA, a movable assembly 1-MA and a driving module 1-DM. The deforming member 1-101 is connected between the movable element 1-103 and the first optical element 1-OE, the movable element 1-103 is movable relative to the fixed assembly 1-FA, and the driving module 1-DM is configured to drive the movable element 1-103 to move relative to the fixed assembly 1-FA. Specifically, the movable assembly 1-MA is movably connected to the movable element 1-103 via the connecting assembly 1-CA, and the driving module 1-DM drives the movable assembly 1-MA to move relative to the fixed assembly 1-FA, thereby driving the movable element 1-103.

In this embodiment, as shown in FIG. 2 and FIG. 3, the fixed assembly 1-FA includes a casing 1-102, a frame 1-104, and a base 1-112. The casing 1-102 is fixedly connected to the base 1-112, and the frame 1-104 can also be fixedly connected to the inner wall surface of the casing 1-102. A main axis 1-AX can be defined by the fixed assembly 1-FA. When the optical system 1-100 is not activated, the main axis 1-AX is parallel to or overlaps an optical axis 1-O of the first optical element 1-OE. In addition, the movable element 1-103 has a movable element surface 1-103S which faces the first optical element 1-OE.

As shown in FIG. 2 and FIG. 3, the aforementioned casing 1-102 has a hollow structure, and a casing opening 1-1021 is formed thereon. A base opening 1-1121 is formed on the base 1-112, The center of the casing opening 1-1021 corresponds to the optical axis 1-O of the first optical element 1-OE, and the base opening 1-1121 corresponds to a photosensitive element (not shown in the figure) disposed below the base 1-112. In this embodiment, the first optical element 1-OE is fixedly disposed in the casing opening 1-1021. The external light can enter the casing 1-102 through the first optical element 1-OE and then is received by the aforementioned photosensitive element after passing through the base opening 1-1121 so as to generate a digital image signal.

Furthermore, the casing 1-102 is disposed on the base 1-112 and may have an accommodating space 1-1023 configured to accommodate the movable element 1-103, the frame 1-104, and the movable assembly 1-MA, the connecting assembly 1-CA, and the driving module 1-DM.

As shown in FIG. 2 and FIG. 3, in this embodiment, the movable assembly 1-MA may include four movable members (a first movable member 1-1081, a second movable member 1-1082, and a third movable member 1-1083 and a fourth movable member 1-1084), and the connecting assembly 1-CA may include four connecting members (a first connecting member 1-1051, a second connecting member 1-1052, a third connecting member 1-1053, and a fourth connecting member 1-1054). The first movable member 1-1081 to the fourth movable member 1-1084 are connected to the movable element 1-103 by the first connecting member 1-1051 to the fourth connecting member 1-1054, respectively.

In addition, the optical system 1-100 may further include a first elastic element 1-106 and a second elastic element 1-110, and the base 1-112 may include four protruding columns 1-1123. The outer portion (the outer ring portion) of the first elastic element 1-106 is fixedly disposed on the top surfaces of the protruding columns 1-1123, the outer portion (the outer ring portion) of the second elastic element 1-110 is fixedly disposed on a plane 1-1125 of each of the protruding columns 1-1123, and the inner portions (the inner ring portions) of the first elastic element 1-106 and the second elastic element 1-110 are respectively connected to the upper and lower sides of the movable assembly 1-MA so that the first movable member 1-1081 to the fourth movable member 1-1084 are suspended in the accommodating space 1-1023.

In this embodiment, the driving module 1-DM may include four driving assemblies (a first driving assembly 1-DA1, a second driving assembly 1-DA2, a third driving assembly 1-DA3, and a fourth driving assembly 1-DA4). The first driving assembly 1-DA1 includes a first driving coil 1-CL1 and a first magnetic element 1-MG1, and the second driving assembly 1-DA2 includes a second driving coil 1-CL2 and a second magnetic element 1-MG2, the third driving assembly 1-DA3 includes a third driving coil 1-CL3 and a third magnetic element 1-MG3, and the fourth driving assembly 1-DA4 includes a fourth driving coil 1-CL4 and a fourth magnetic element 1-MG4.

In this embodiment, each magnetic element has a magnetic surface. For example, as shown in FIG. 2, the first magnetic element 1-MG1 and the second magnetic element 1-MG2 respectively have a first magnetic surface 1-MS1 and a second magnetic surface 1-MS2, the first magnetic surface 1-MS1 faces the first driving coil 1-CL1, the second magnetic surface 1-MS2 faces the second driving coil 1-CL2, and the first magnetic surface 1-MS1 and the second magnetic surface 1-MS2 face different directions.

In this embodiment, as shown in FIG. 2, the frame 1-104 has a plurality of grooves 1-1041 and a central opening 1-1043. In this embodiment, the frame 1-104 has four grooves 1-1041 configured to receive the four magnetic elements, but the number of the grooves 1-1041 and the magnetic elements is not limited to this embodiment. The central opening 1-1043 is configured to accommodate the first driving coil 1-CL1 to the fourth driving coil 1-CL4 and the first movable member 1-1081 to the fourth movable member 1-1084.

In this embodiment, the first driving coil 1-CL1 to the fourth driving coil 1-CL4 may be winding coils, which are respectively disposed on the first movable member 1-1081 to the fourth movable member 1-1084, and when the first driving coil 1-CL1 to the fourth driving coil 1-CL4 are provided with electricity, they can respectively act with the first magnetic element 1-MG1 to the fourth magnetic element 1-MG4 to generate an electromagnetic driving force to drive at least one of the first movable member 1-1081 to the fourth movable member 1-1084 to move relative to the base 1-112 and the frame 1-104 along the optical axis 1-O (the Z-axis) so as to perform functions of auto focusing or optical image stabilization.

The driving assembly of the driving module 1-DM can actuate individually or cooperatively. For example, the first driving assembly 1-DA1 is configured to drive the first movable member 1-1081 to move relative to the fixed assembly 1-FA, and the second driving assembly 1-DA2 is configured to drive the second movable member 1-1082 to move relative to the fixed assembly 1-FA and the first movable member 1-1081, and so on.

Furthermore, as shown in FIG. 2, in this embodiment, the fixed assembly 1-FA may further include at least one circuit member 1-170 configured to be electrically connected to the driving module 1-DM through the first elastic element 1-106 or the second elastic element 1-110. The circuit member 1-170 may be implemented by insert molding technology, but it is not limited thereto.

Figure 4:
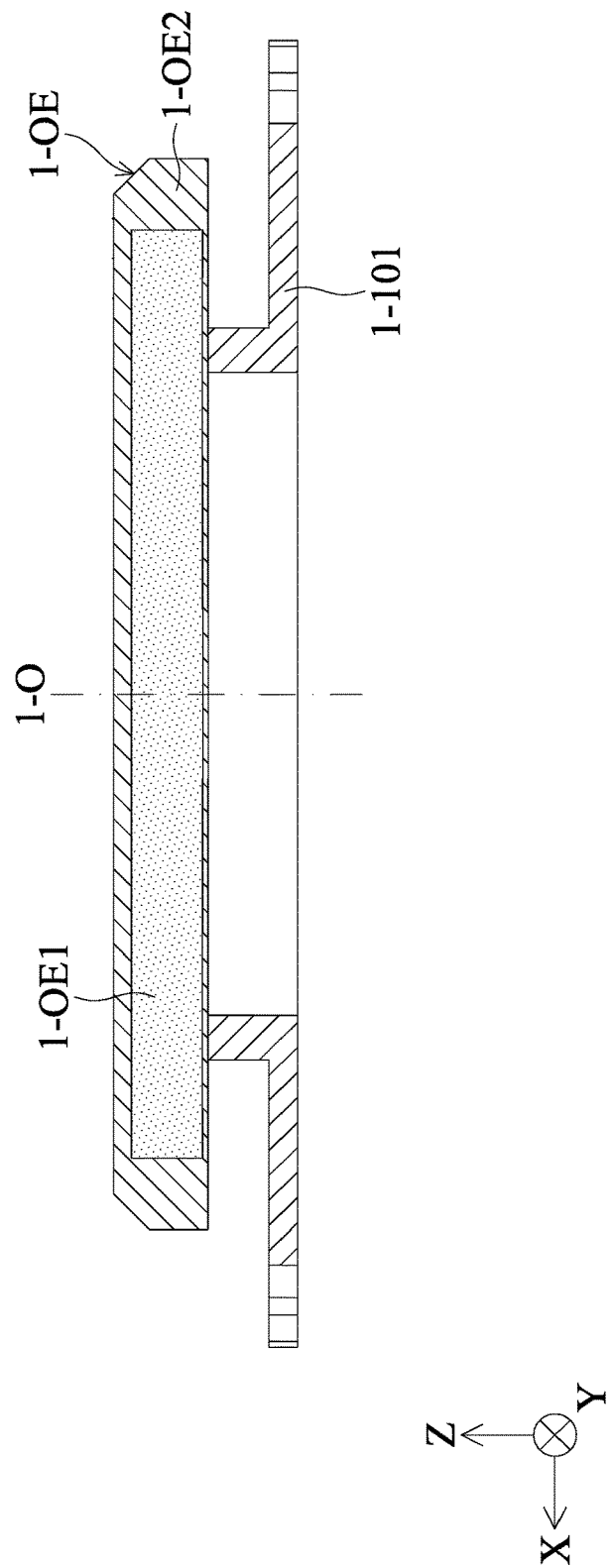
FIG. 4 is a schematic diagram illustrating that the first optical element 1-OE is not pushed by the deforming member 1-101 according to an embodiment of the present disclosure.
Figure 5:
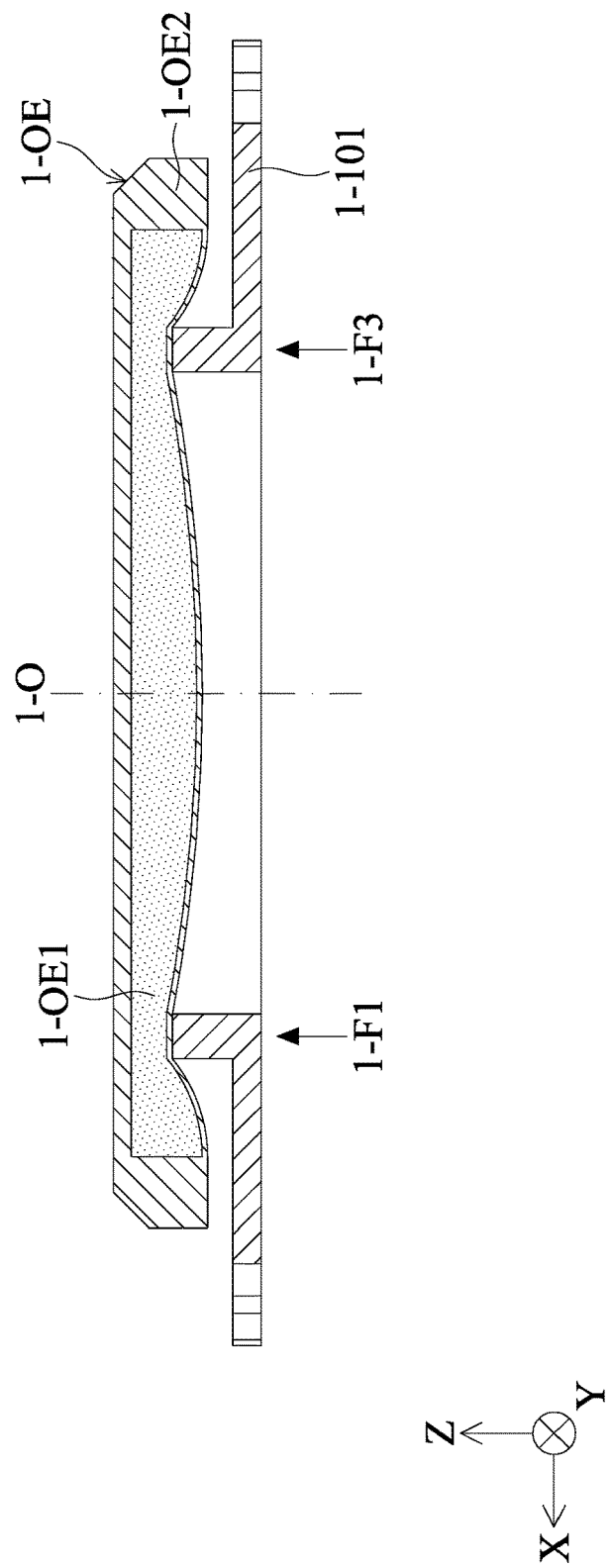
FIG. 5 and FIG. 6 are schematic diagrams of the first optical element 1-OE after being pushed by the deforming member 1-101 according to an embodiment of the present disclosure.
Figure 6:
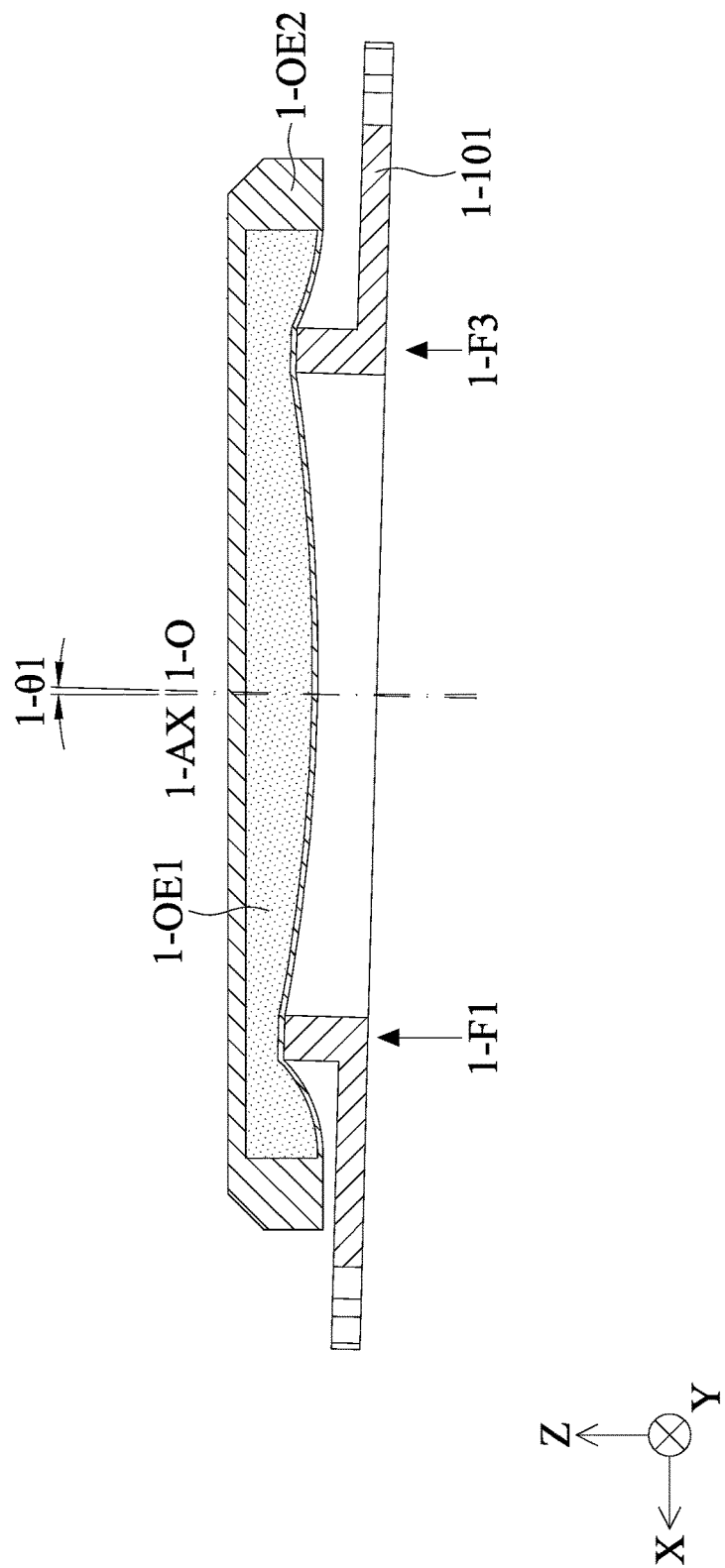

Next, please refer to FIG. 4 to FIG. 6. FIG. 4 is a schematic diagram illustrating that the first optical element 1-OE is not pushed by the deforming member 1-101 according to an embodiment of the present disclosure, and FIG. 5 and FIG. 6 are schematic diagrams of the first optical element 1-OE after being pushed by the deforming member 1-101 according to an embodiment of the present disclosure. As shown in FIG. 4, the first optical element 1-OE may be a liquid lens, including a liquid lens element 1-OE1 and a fixed member 1-OE2. The liquid lens element 1-OE1 is disposed within of the fixed member 1-OE2 having a hollow structure that protects and supports the liquid lens element 1-OE1. The deforming member 1-101 is disposed under the liquid lens element 1-OE1 and the fixed member 1-OE2. The bottom of the fixed member 1-OE2 may be a thin film, so that the deforming member 1-101 may be used for changing the shape of the liquid lens element 1-OE1.

FIG. 4 shows that the liquid lens element 1-OE1 is not deformed and the deforming member 1-101 is in an initial position, and the liquid lens element 1-OE1 has an optical axis 1-O. When the driving module 1-DM drives the movable assembly 1-MA to move, for example, applying a driving current to the driving coils of the driving module 1-DM, a magnetic force is generated between the driving coils and the corresponding magnetic elements, so that the movable assembly 1-MA is driven to move through the magnetic force and to force the deforming member 1-101 though the connecting assembly 1-CA to press the lower side of the liquid lens element 1-OE1. Therefore the liquid lens element 1-OE1 is deformed.

As shown in FIG. 2 and FIG. 5, when the first driving assembly 1-DA1 and the third driving assembly 1-DA3 of the driving module 1-DM provide pushing forces 1-F1, 1-F3 of the same magnitude, the deforming member 1-101 translates along the optical axis 1-O. At this time, the lens curvature of the liquid lens element 1-OE1 is changed from the curvature of the liquid lens element 1-OE1 in FIG. 4. That is, the shape of the liquid lens element 1-OE1 is changed. Therefore, the optical properties of the liquid lens element 1-OE1 can be changed, thereby achieving an optical zoom, focus or shock-proofing effect.

Similarly, referring to FIG. 6, when the driving module 1-DM drives the deforming member 1-101 with a tilted movement, as illustrated in FIG. 6, the deforming member 1-101 obliquely moves and provides an unequal amount of pushing forces 1-F1 and 1-F3 to two different sides of the liquid lens element 1-OE1, so that the optical axis 1-O of the liquid lens element 1-OE1 is rotated and is deviated from the main axis 1-AX. That is, there is an angle 1-O1 formed between them. Therefore, the optical properties of the liquid lens element 1-OE1 are changed, and the optical zoom, focusing or shock-proofing effect can be accomplished.

Figure 7:
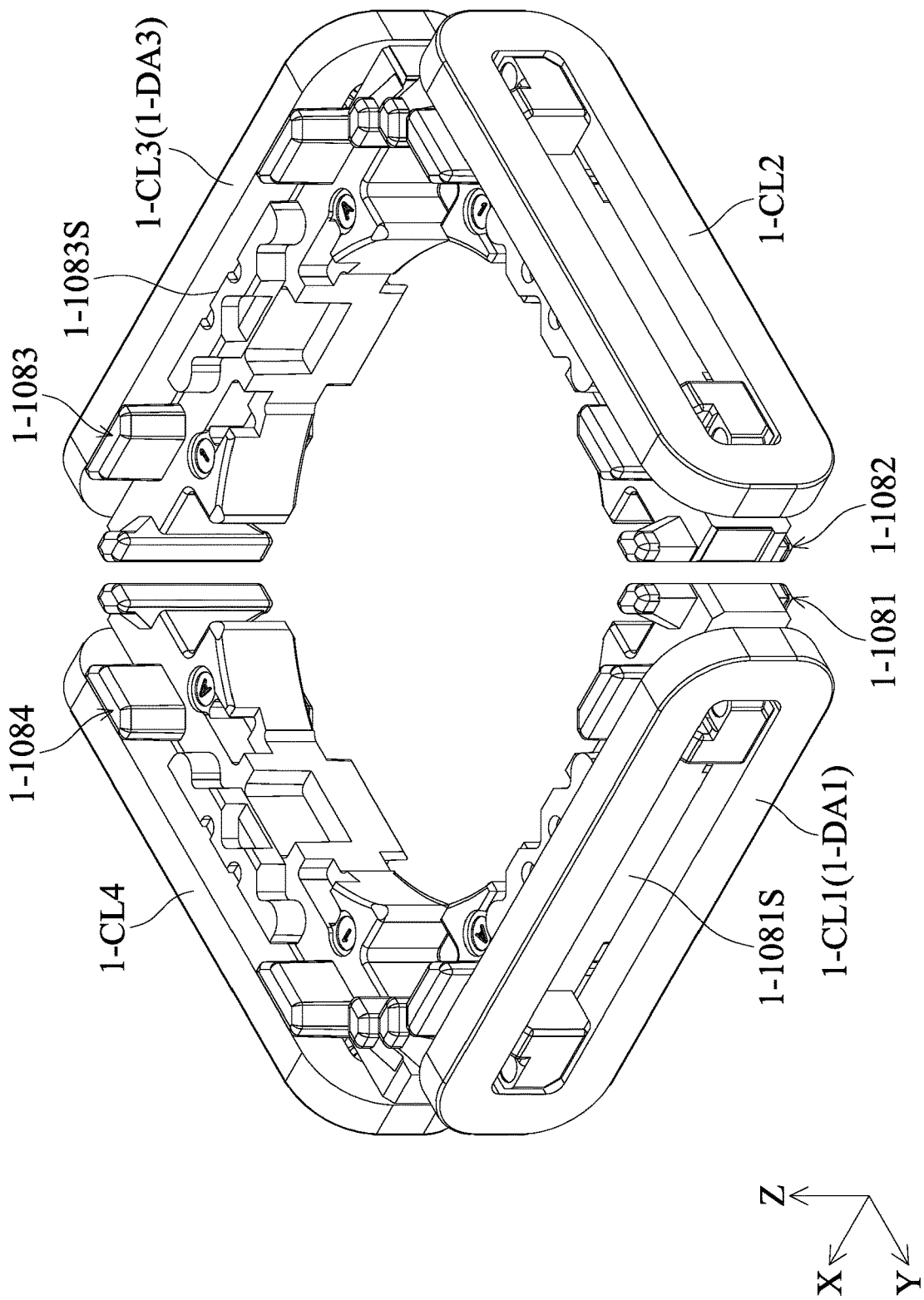
FIG. 7 is a schematic diagram of a partial structure of the optical system 1-100 according to an embodiment of the present disclosure.

Next, please refer to FIG. 2 and FIG. 7. FIG. 7 is a schematic diagram of a partial structure of the optical system 1-100 according to an embodiment of the present disclosure. In this embodiment, the first movable member 1-1081 of the movable assembly 1-MA has a first movable member surface 1-1081S, the third movable member 1-1083 has a third movable member surface 1-1083S, the first movable member surface 1-1081S faces the first driving assembly 1-DA1, and the third movable member surface 1-1083S faces the third driving assembly 1-DA3.

Figure 8:
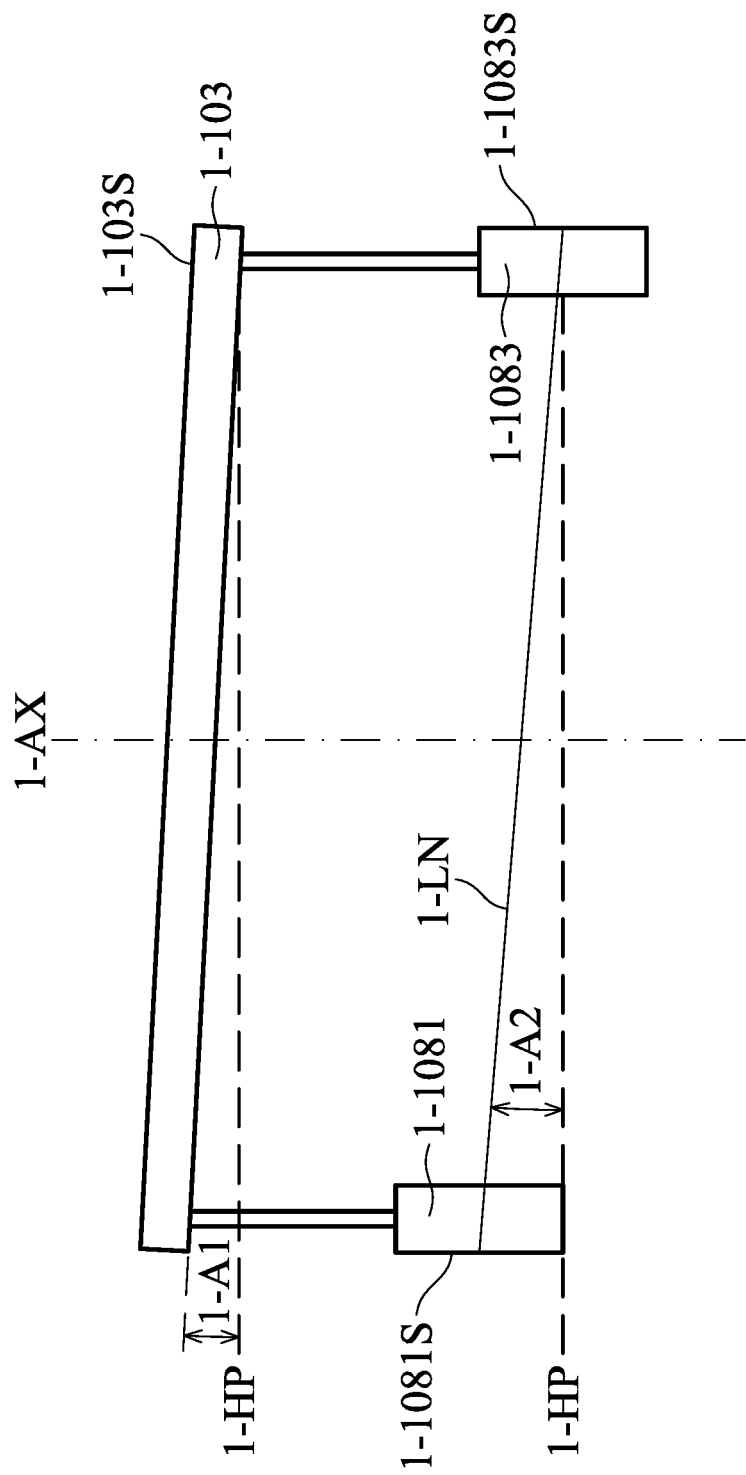
FIG. 8 is a schematic diagram of a partial structure of the optical system 1-100 according to an embodiment of the present disclosure.

Please continue to refer to FIG. 8, which is a schematic diagram of a partial structure of the optical system 1-100 according to an embodiment of the present disclosure. An imaginary plane 1-HP can be defined by the optical system 1-100, and the imaginary plane 1-HP is perpendicular to the main axis 1-AX. When the driving module 1-DM drives the movable assembly 1-MA and when viewed in a direction perpendicular to the main axis 1-AX, an angle 1-A1 between the movable element surface 1-103S and the imaginary plane 1-HP is less than or equal to an angle 1-A2 formed between a line 1-LN connecting the center of the first movable member surface 1-1081S with the center of the third movable member surface 1-1083S and the imaginary plane 1-HP.

Figure 9:
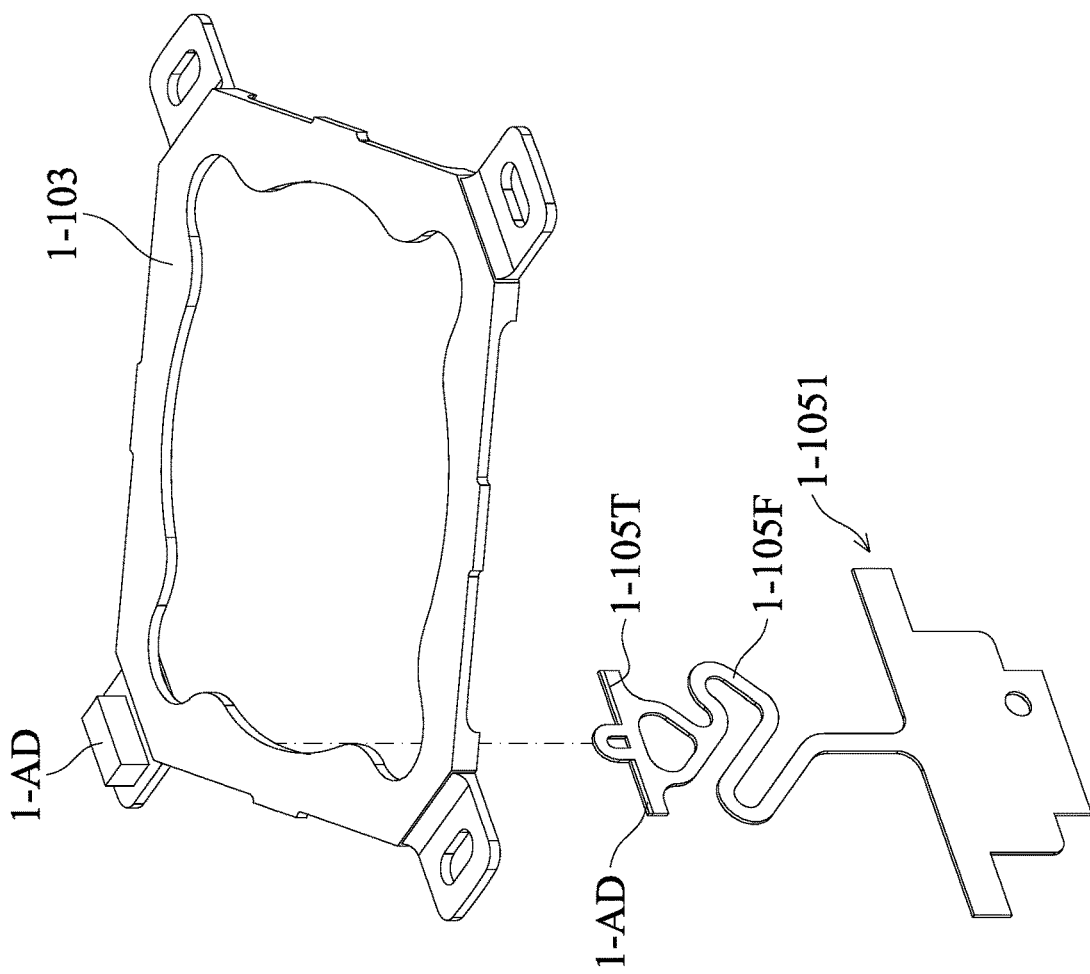
FIG. 9 is a schematic diagram of the first connecting member 1-1051 and the movable element 1-103 according to an embodiment of the present disclosure.

Please refer to FIG. 2 and FIG. 9. FIG. 9 is a schematic diagram of the first connecting member 1-1051 and the movable element 1-103 according to an embodiment of the present disclosure. The movable assembly 1-MA is connected to the movable element 1-103 through four connecting members. For example, the first movable member 1-1081 is connected to the movable element 1-103 via an elastic portion 1-105F of the first connecting member 1-1051.

As shown in FIG. 2 and FIG. 9, the elastic portion 1-105F may have a plate-shaped structure which is substantially parallel to the main axis 1-AX. Furthermore, the first connecting member 1-1051 has a platform surface 1-105T facing the movable element 1-103. In addition, the optical system 1-100 may further include an adhesive member 1-AD disposed between the platform surface 1-105T and the movable element 1-103. The adhesive member 1-AD can be glue or solder.

Figure 10:
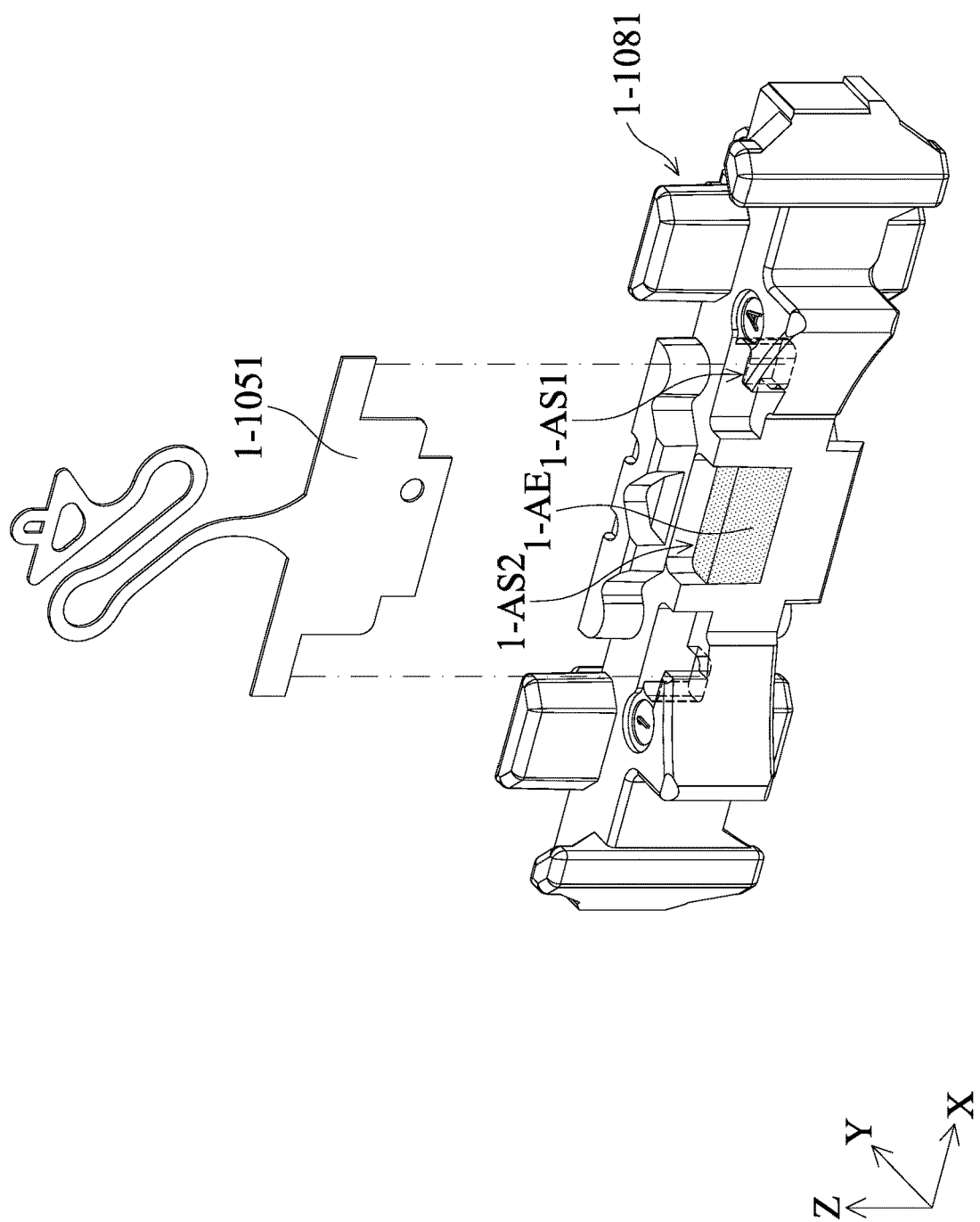
FIG. 10 is a schematic diagram of the first connecting member 1-1051 and the first movable member 1-1081 according to an embodiment of the present disclosure.

Please refer to FIG. 10, which is a schematic diagram of the first connecting member 1-1051 and the first movable member 1-1081 according to an embodiment of the present disclosure. As shown in FIG. 10, the first movable member 1-1081 of the movable assembly 1-MA may have a first accommodating slot 1-AS1, and the first accommodating slot 1-AS1 is configured to accommodate the first connecting member 1-1051.

In addition, the first movable member 1-1081 may further include a second accommodating slot 1-AS2, and an adhesive element AE may be disposed in the second accommodating slot 1-AS2 and is configured to adhere to the first connecting member 1-1051, so that the first connecting member 1-1051 is fixedly disposed on the first movable member 1-1081.

Figure 11:
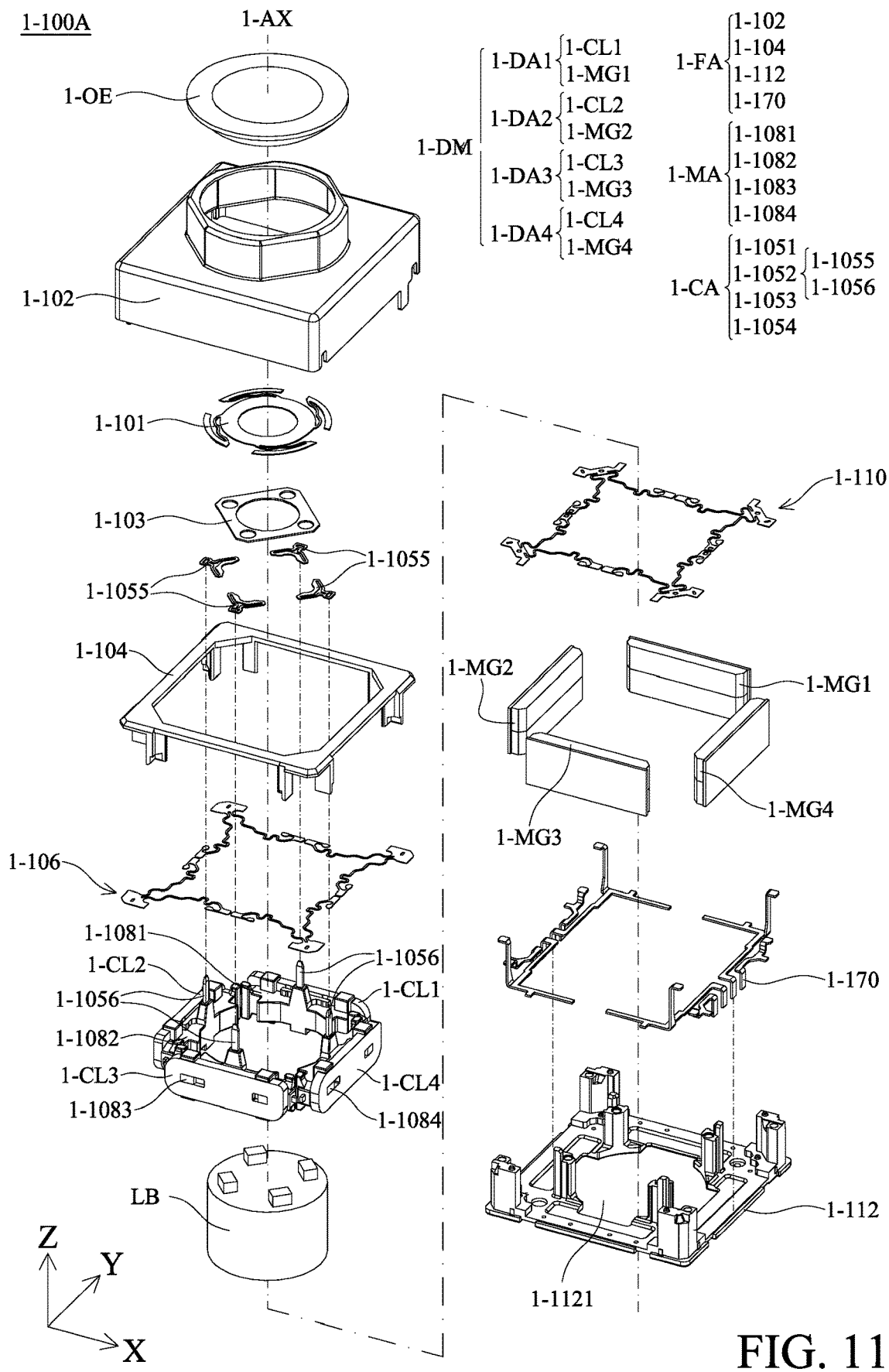
FIG. 11 is an exploded diagram of an optical system 1-100A according to another embodiment of the present disclosure.
Figure 11A:
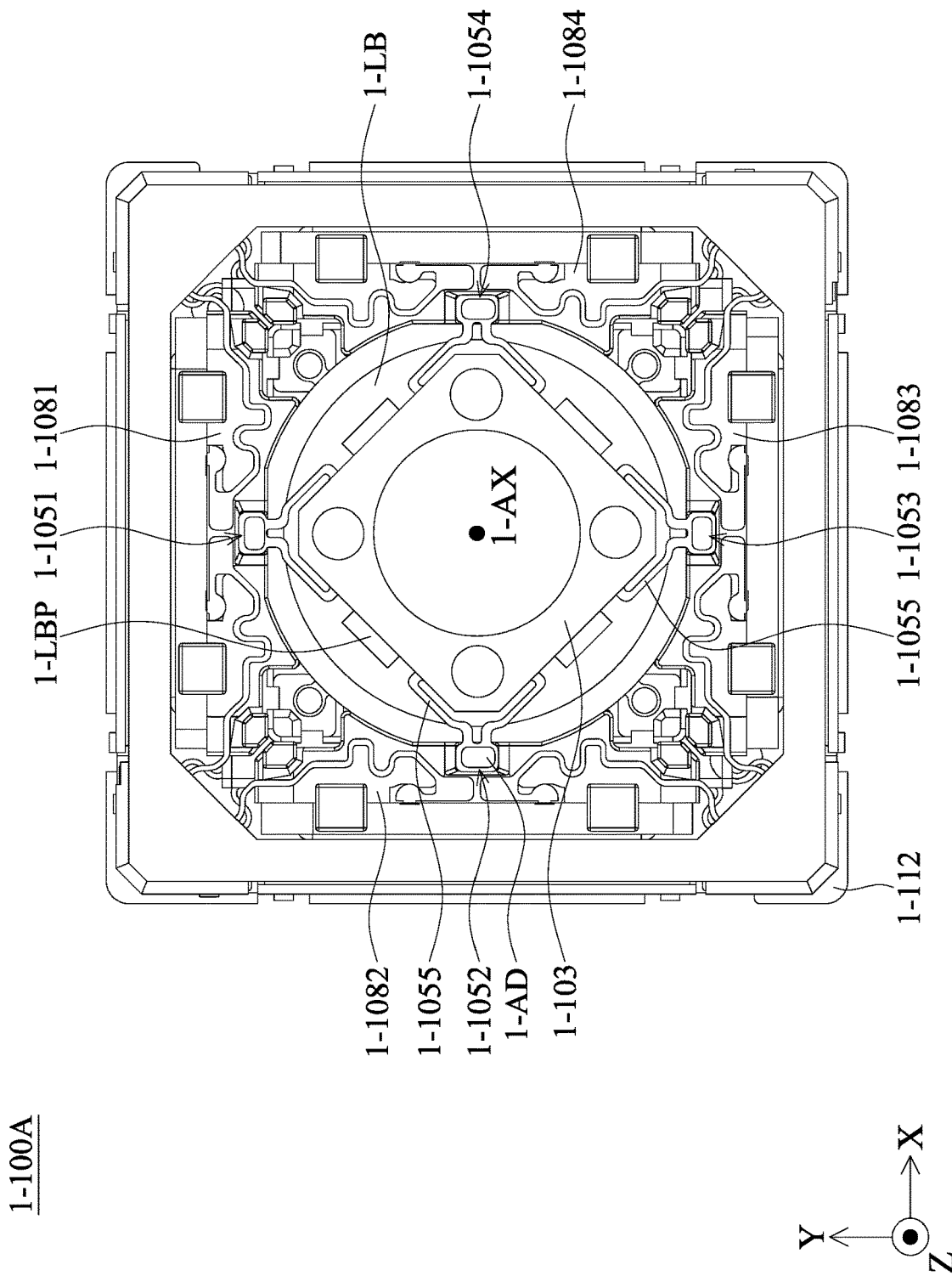
FIG. 11A is a top view of a partial structure of the optical system 1-100A according to another embodiment of the present disclosure.
Figure 12:
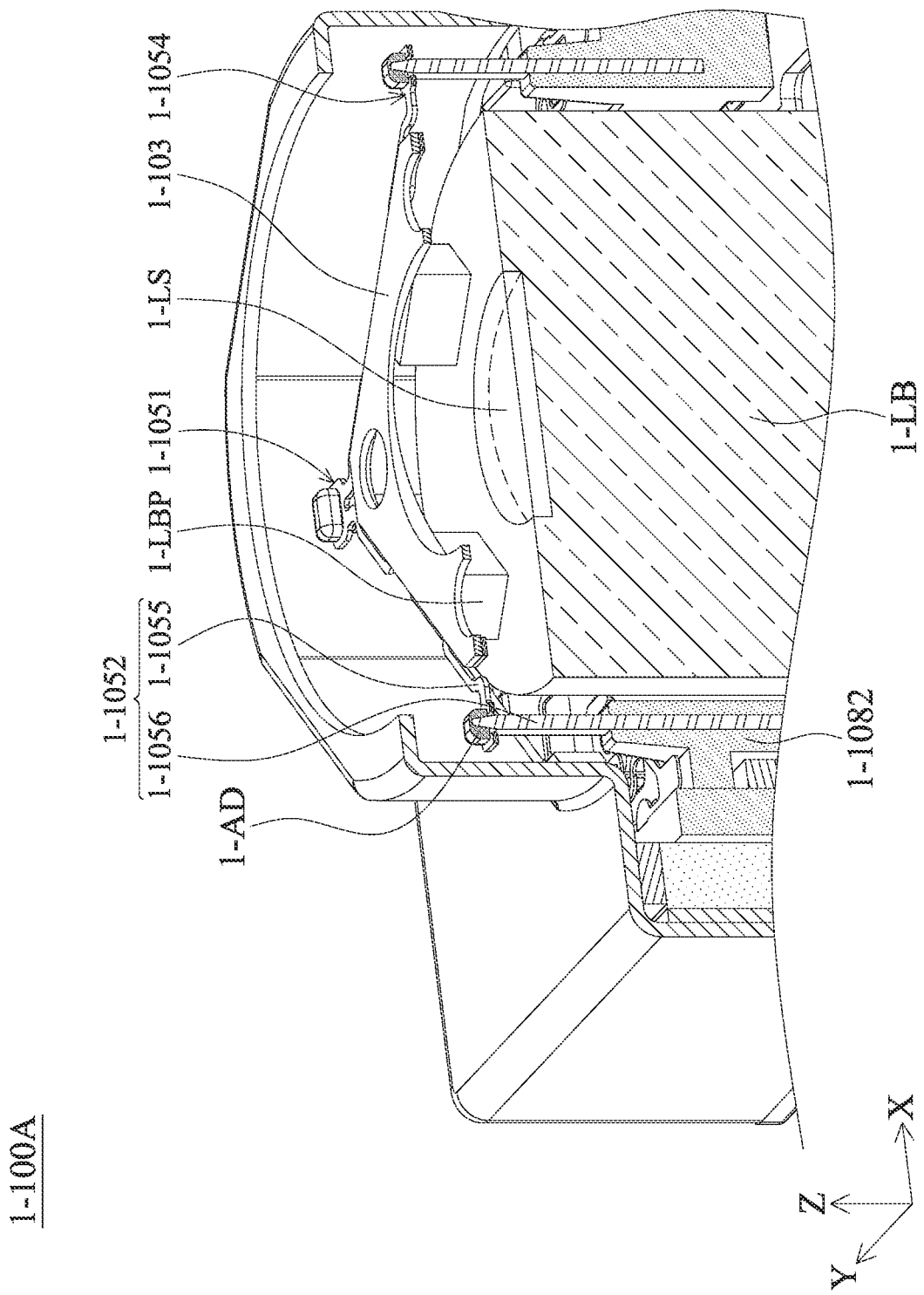
FIG. 12 is a perspective sectional view of the optical system 1-100A according to another embodiment of the present disclosure.
Figure 13:
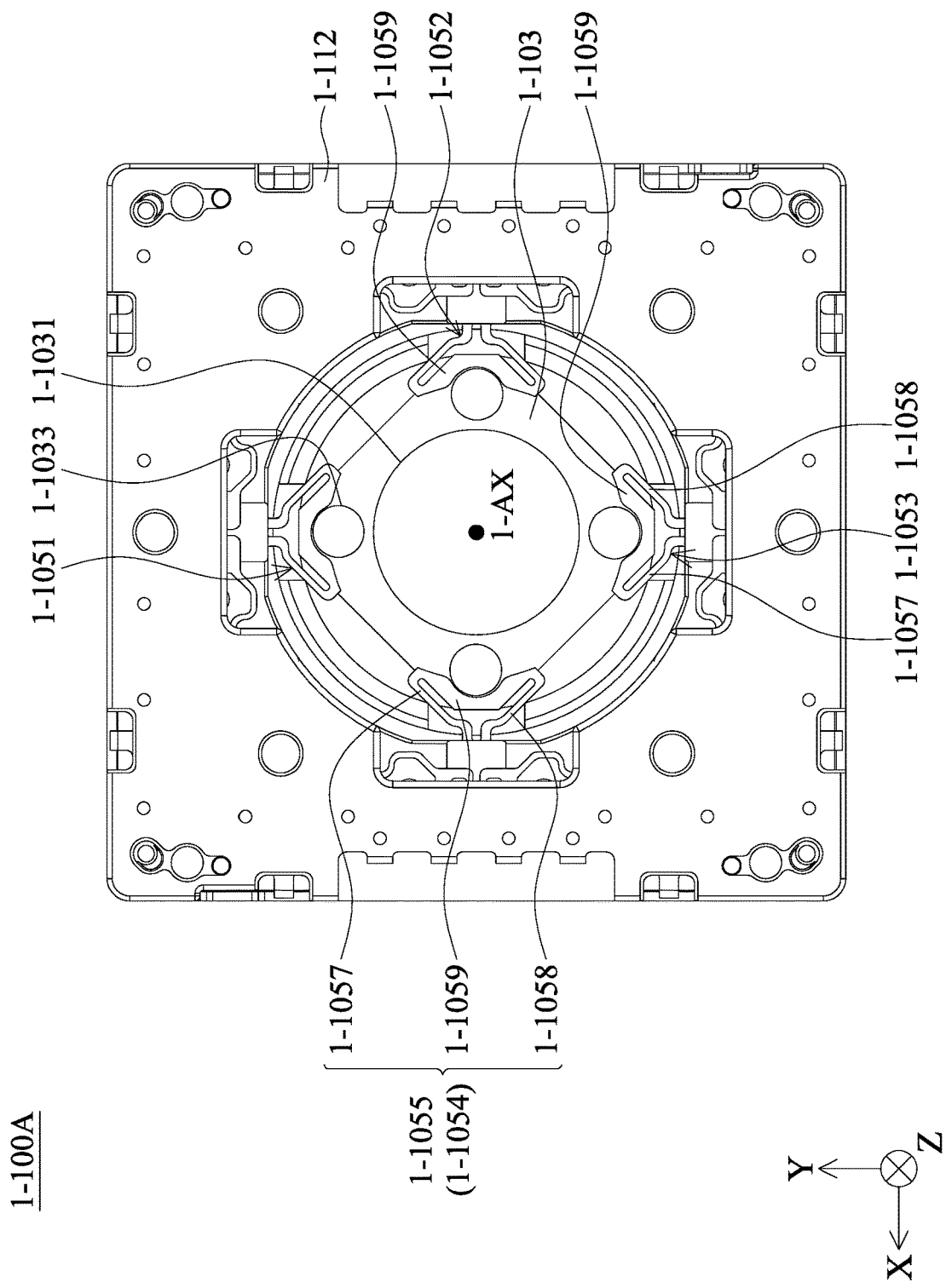
FIG. 13 is a bottom view of a partial structure of the optical system 1-100A according to another embodiment of the present disclosure.

Please refer to FIG. 11 to FIG. 13. FIG. 11 is an exploded diagram of an optical system 1-100A according to another embodiment of the present disclosure, FIG. 11A is a top view of a partial structure of the optical system 1-100A according to another embodiment of the present disclosure, FIG. 12 is a perspective sectional view of the optical system 1-100A according to another embodiment of the present disclosure, and FIG. 13 is a bottom view of a partial structure of the optical system 1-100A according to another embodiment of the present disclosure. The optical system 1-100A is similar to the optical system 1-100. In this embodiment, the connecting assembly 1-CA of the optical system 1-100A also includes four connecting members.

Each connecting member may have an elastic portion and a rigid portion. As shown in FIG. 11, FIG. 11A, and FIG. 12, the second connecting member 1-1052 has an elastic portion 1-1055 and a rigid portion 1-1056. The elastic portion 1-1055 may have a plate-shaped structure, which is not parallel to the main axis 1-AX, for example, perpendicular to the main axis 1-AX, and the rigid portion 1-1056 is connected to the elastic portion 1-1055 by the adhesive member 1-AD. The rigid portion 1-1056 is connected between the elastic portion 1-1055 and the second movable member 1-1082 of the movable assembly 1-MA, and in the direction of the main axis 1-AX (the Z-axis), the elastic coefficient of the rigid portion 1-1056 is greater than the elastic coefficient of the elastic portion 1-1055. That is, in the Z-axis, the second connection member 1-1052 is harder, and it is softer (more elastic) in the X-axis or in the Y-axis.

Furthermore, as shown in FIG. 12, the optical system 1-100A further includes a lens barrel 1-LB configured to accommodate at least one second optical element 1-LS, and the second optical element 1-LS is a solid lens. The lens barrel 1-LB has four projections 1-LBP, which extend toward the movable element 1-103.

In this embodiment, the elastic portions of the connecting members of the connecting assembly 1-CA are arranged around the main axis 1-AX. Specifically, as shown in FIG. 11A, the elastic portions 1-1055 of the first connecting member 1-1051 to the fourth connecting member 1-1054 are disposed around the main axis 1-AX. In addition, as shown in FIG. 11A and FIG. 12, when viewed in the direction of the main axis 1-AX, the projections 1-LBP are located between two adjacent elastic portions 1-1055.

Next, please continue to refer to FIG. 11A and FIG. 13 (the lens barrel 1-LB and the second optical element 1-LS are not shown in FIG. 13). The elastic portion 1-1055 may include a first cantilever 1-1057, a second cantilever 1-1058, and a contact portion 1-1059. The first cantilever 1-1057 and the second cantilever 1-1058 are symmetrically arranged. For example, the first cantilever 1-1057 and the second cantilever 1-1058 of the fourth connecting member 1-1054 are symmetrical with respect to the X-axis, and the contact portion 1-1059 is fixed on the bottom of the movable element 1-103.

In this embodiment, when viewed in the direction of the main axis 1-AX, the movable element 1-103 does not overlap at least one portion of the first cantilever 1-1057. As shown in FIG. 13, only a part of the first cantilever 1-1057 and the second cantilever 1-1058 overlap the movable element 1-103. It should be noted that in other embodiments, the first cantilever 1-1057 and the second cantilever 1-1058 may not overlap the movable element 1-103 completely.

In addition, as shown in FIG. 13, an opening 1-1031 and four perforations 1-1033 may be formed on the movable element 1-103. The main axis 1-AX passes through the opening 1-1031, and these perforations 1-1033 are adjacent to the opening 1-1031. Specifically, these perforations 1-1033 are configured to surround the opening 1-1031 in a symmetrical manner. Based on the design of perforations 1-1033, the operator can take movable element 1-103 by the perforations 1-1033 without touching the central opening 1-1031 when performing assembly operation so as to avoid damaging the opening 1-1031.

Figure 14:
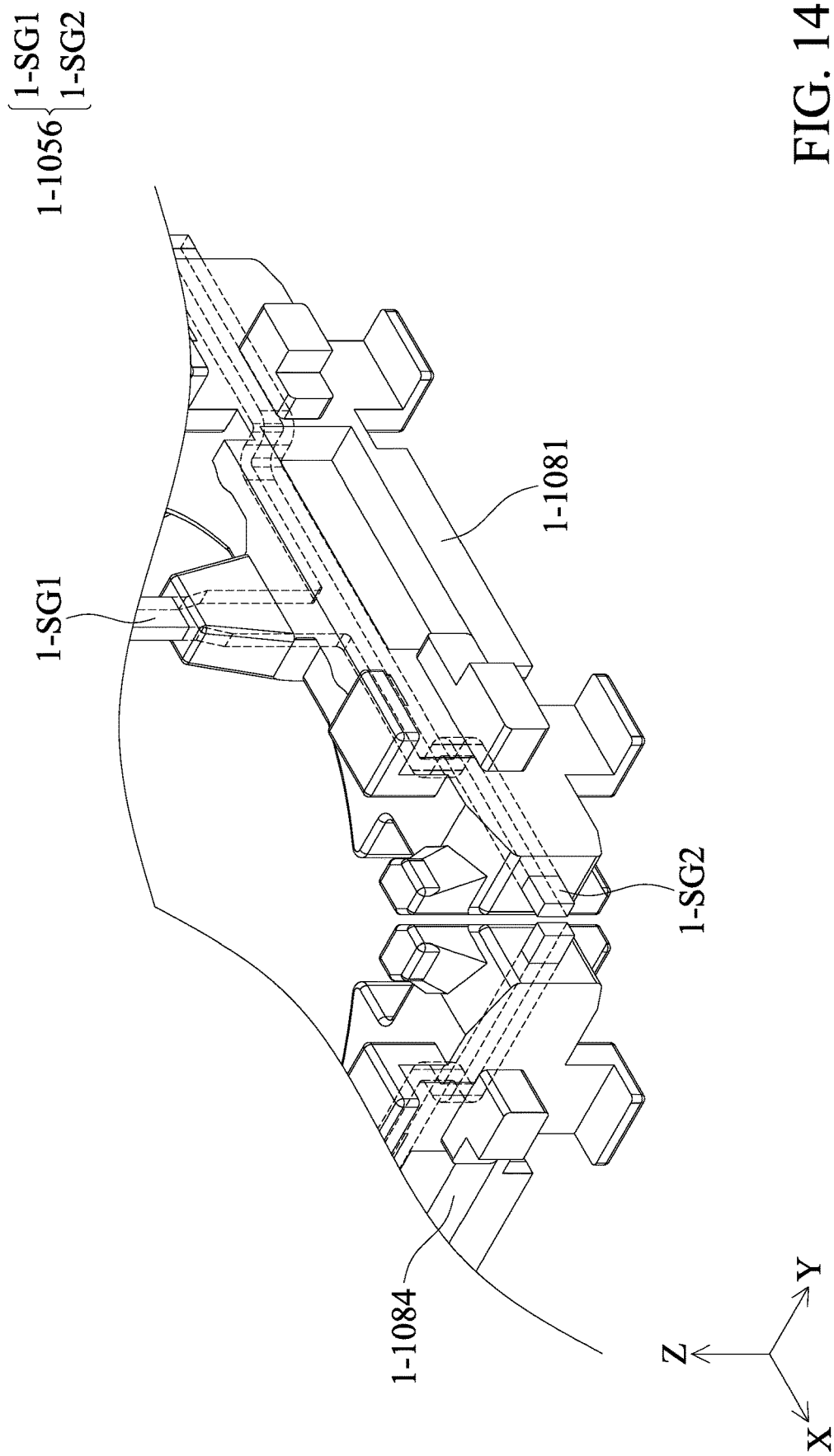
FIG. 14 is a partial structural diagram of the movable assembly 1-MA according to another embodiment of the present disclosure.

Please refer to FIG. 12 and FIG. 14. FIG. 14 is a partial structural diagram of the movable assembly 1-MA according to another embodiment of the present disclosure. In this embodiment, a portion of the rigid portion 1-1056 is embedded in the first movable member 1-1081. The rigid portion 1-1056 may include a first section 1-SG1 and a second section 1-SG2 connected to the first section 1-SG1, and the second section 1-SG2 is not parallel to the first section 1-SG1. For example, the first section 1-SG1 is perpendicular to the second section 1-SG2.

Figure 15:
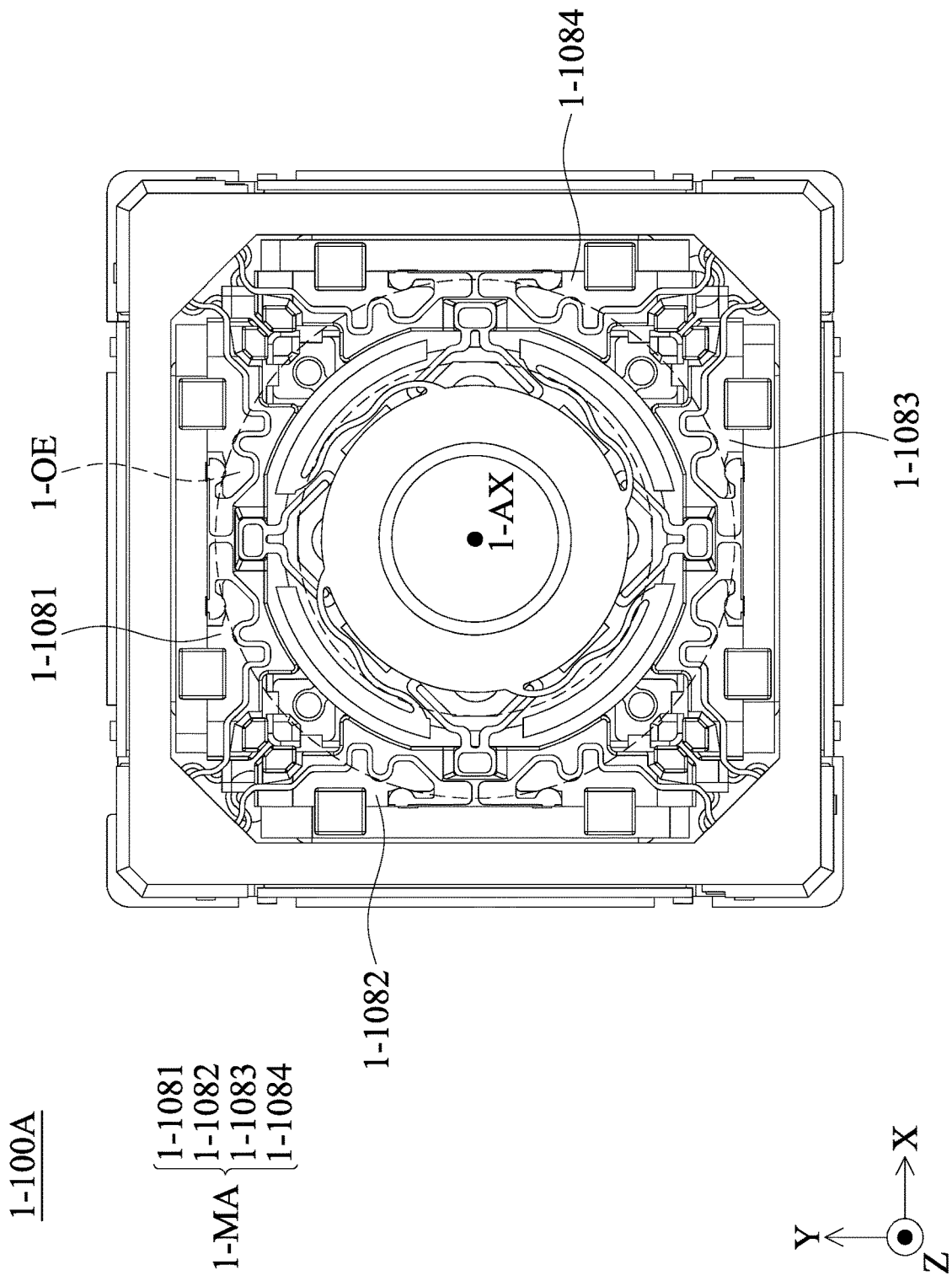
FIG. 15 is a top view of a partial structure of the optical system 1-100A according to another embodiment of the present disclosure.

Please refer to FIG. 15, which is a top view of a partial structure of the optical system 1-100A according to another embodiment of the present disclosure. In this embodiment, when viewed in the direction of the main axis 1-AX, the movable assembly 1-MA overlaps the first optical element 1-OE, which means that the first optical element 1-OE is larger and has better optical characteristics, such as a greater amount of light. In other embodiments, the movable assembly 1-MA may not overlap the first optical element 1-OE. Because the first optical element 1-OE is small, it can achieve the effect of weight reduction.

The present disclosure provides an optical system having a first optical element 1-OE, a deforming member 1-101, a movable element 1-103, a fixed assembly 1-FA, a connecting assembly 1-CA, a movable assembly 1-MA, and a driving module 1-DM. The movable element 1-103 is configured to be connected to the first optical element 1-OE through the deforming member 1-101, and the movable assembly 1-MA is connected to the movable element 1-103 through the connecting assembly 1-CA. When driving module 1-DM is configured to drive movable assembly 1-MA to move relative to fixed assembly 1-FA, the movable element 1-103 can be moved to drive the deforming member 1-101 to push the bottom of first optical element 1-OE, thereby changing the optical properties of the liquid lens element 1-OE1.

In addition, each movable member of the movable assembly 1-MA can be moved independently or cooperatively, so that the optical properties of the liquid lens element 1-OE1 can be changed according to different needs. Thereby, functions such as optical zoom, optical focus or optical shake compensation can be achieved, and the performance of the driving mechanism can be improved.

The Second Embodiment Group

Figure 16:
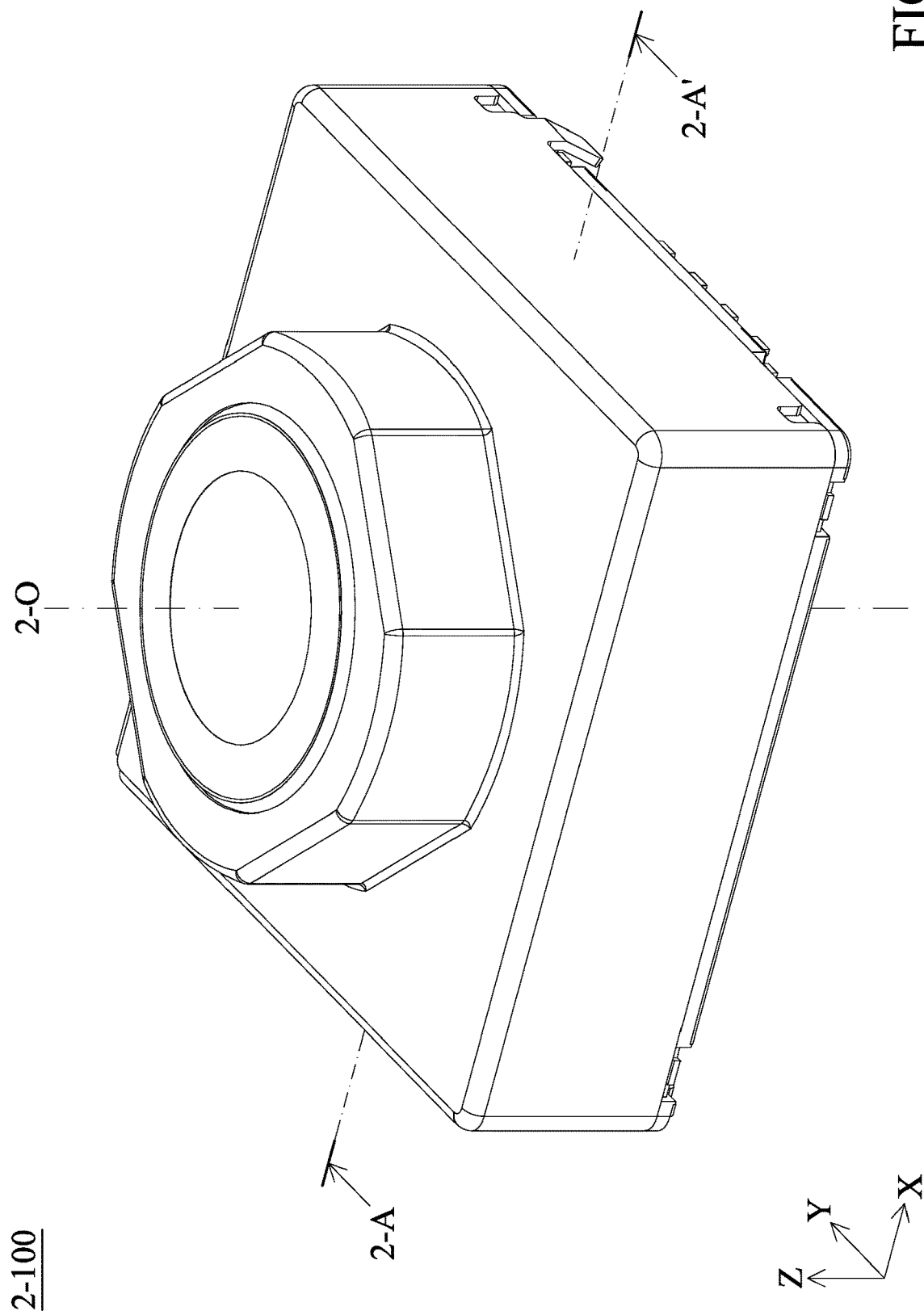
FIG. 16 is a schematic diagram of an optical system 2-100 according to an embodiment of the present disclosure.
Figure 17:
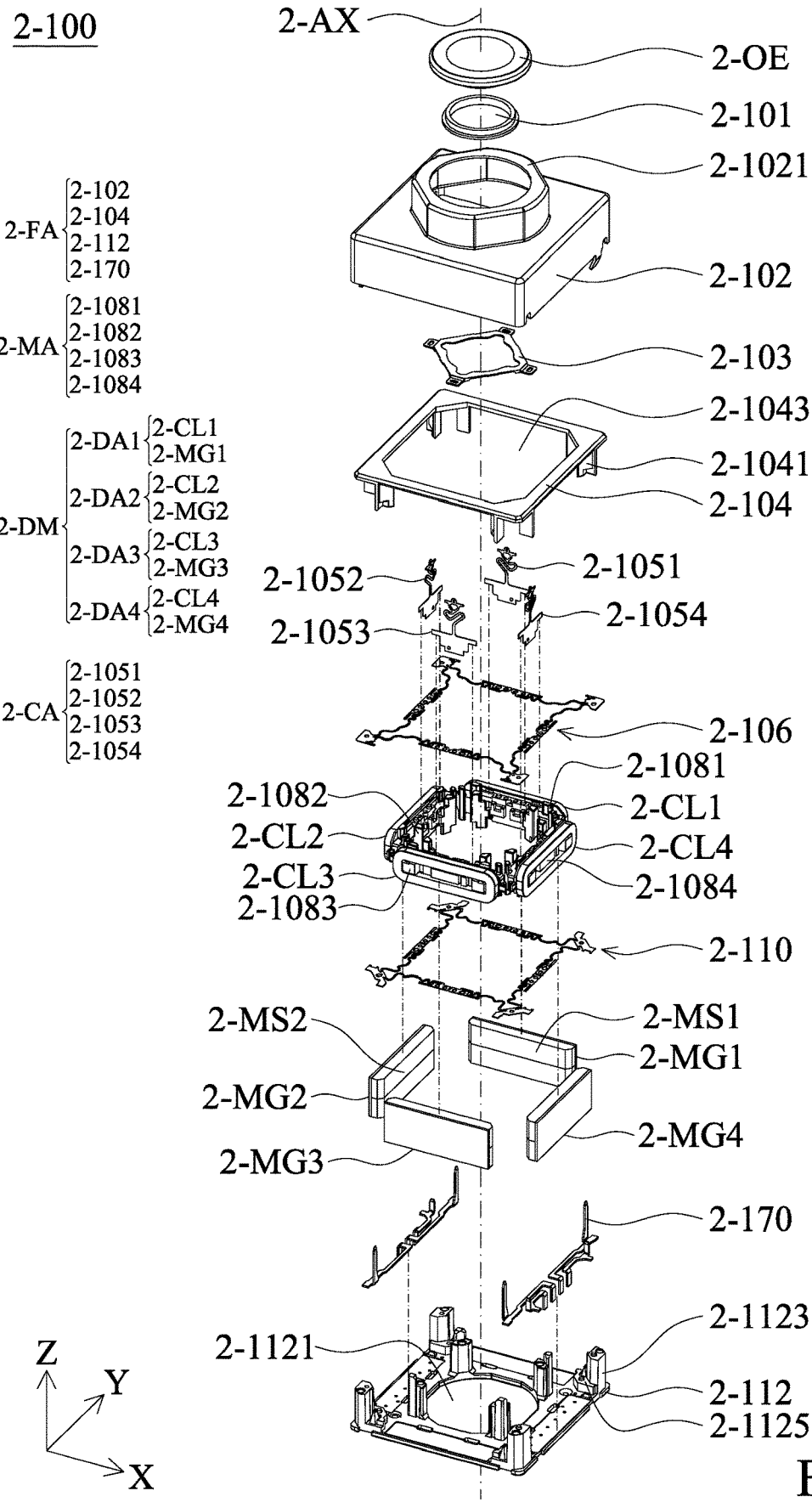
FIG. 17 is an exploded diagram of an optical system 2-100 according to an embodiment of the present disclosure.
Figure 18:
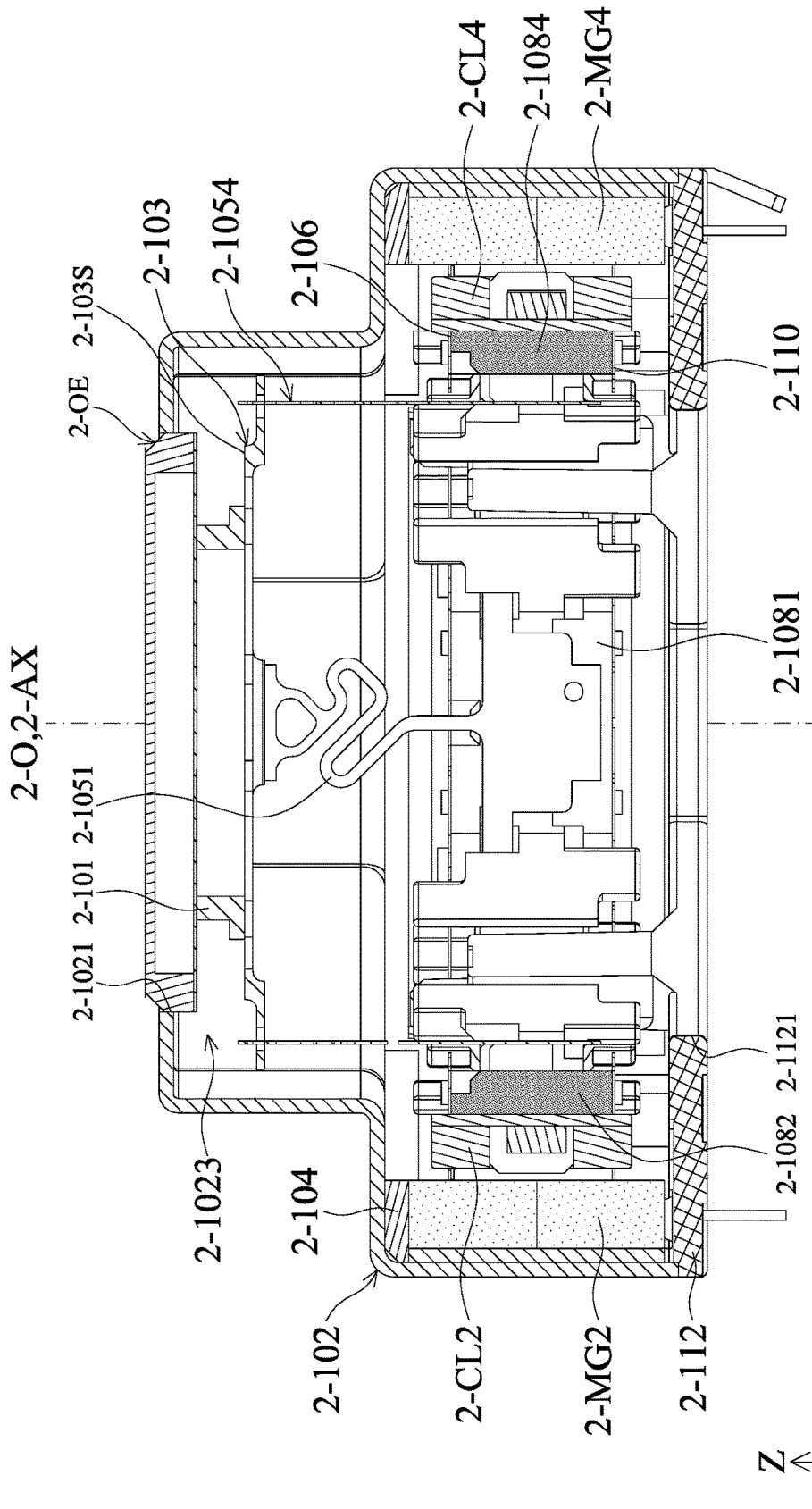
FIG. 18 is a cross-sectional view of the optical system 2-100 along line (2-A)-(2-A') in FIG. 16 according to an embodiment of the present disclosure.

Please refer to FIG. 16 to FIG. 18. FIG. 16 is a schematic diagram of an optical system 2-100 according to an embodiment of the present disclosure, FIG. 17 is an exploded diagram of an optical system 2-100 according to an embodiment of the present disclosure, and FIG. 18 is a cross-sectional view of the optical system 2-100 along line (2-A)-(2-A') in FIG. 16 according to an embodiment of the present disclosure. The optical system 2-100 can be an optical camera system and can be configured to hold and drive a first optical element 2-OE, and the first optical element 2-OE may define an optical axis 2-O. The optical system 2-100 can be installed in different electronic devices or portable electronic devices, such as a smartphone, for allowing a user to perform the image capturing function. In this embodiment, the optical system 2-100 can be a voice coil motor (VCM) with an auto-focusing (AF) function, but it is not limited thereto. In other embodiments, the optical system 2-100 can also perform the functions of auto-focusing and optical image stabilization (OIS).

As shown in FIG. 2, in this embodiment, the optical system 2-100 may include a fixed assembly 2-FA, a deforming member 2-101, a movable element 2-103, and a connecting assembly 2-CA, a movable assembly 2-MA and a driving module 2-DM. The deforming member 2-101 is connected between the movable element 2-103 and the first optical element 2-OE, the movable element 2-103 is movable relative to the fixed assembly 2-FA, and the driving module 2-DM is configured to drive the movable element 2-103 to move relative to the fixed assembly 2-FA. Specifically, the movable assembly 2-MA is movably connected to the movable element 2-103 via the connecting assembly 2-CA, and the driving module 2-DM drives the movable assembly 2-MA to move relative to the fixed assembly 2-FA, thereby driving the movable element 2-103.

In this embodiment, as shown in FIG. 17 and FIG. 18, the fixed assembly 2-FA includes a casing 2-102, a frame 2-104, and a base 2-112. The casing 2-102 is fixedly connected to the base 2-112, and the frame 2-104 can also be fixedly connected to the inner wall surface of the casing 2-102. A main axis 2-AX can be defined by the fixed assembly 2-FA. When the optical system 2-100 is not activated, the main axis 2-AX is parallel to or overlaps an optical axis 2-O of the first optical element 2-OE. In addition, the movable element 2-103 has a movable element surface 2-103S which faces the first optical element 2-OE.

As shown in FIG. 17 and FIG. 18, the aforementioned casing 2-102 has a hollow structure, and a casing opening 2-1021 is formed thereon. A base opening 2-1121 is formed on the base 2-112, The center of the casing opening 2-1021 corresponds to the optical axis 2-O of the first optical element 2-OE, and the base opening 2-1121 corresponds to a photosensitive element (not shown in the figure) disposed below the base 2-112. In this embodiment, the first optical element 2-OE is fixedly disposed in the casing opening 2-1021. The external light can enter the casing 2-102 through the first optical element 2-OE and then is received by the aforementioned photosensitive element after passing through the base opening 2-1121 so as to generate a digital image signal.

Furthermore, the casing 2-102 is disposed on the base 2-112 and may have an accommodating space 2-1023 configured to accommodate the movable element 2-103, the frame 2-104, and the movable assembly 2-MA, the connecting assembly 2-CA, and the driving module 2-DM.

As shown in FIG. 17 and FIG. 18, in this embodiment, the movable assembly 2-MA may include four movable members (a first movable member 2-1081, a second movable member 2-1082, and a third movable member 2-1083 and a fourth movable member 2-1084), and the connecting assembly 2-CA may include four connecting members (a first connecting member 2-1051, a second connecting member 2-1052, a third connecting member 2-1053, and a fourth connecting member 2-1054). The first movable member 2-1081 to the fourth movable member 2-1084 are connected to the movable element 2-103 by the first connecting member 2-1051 to the fourth connecting member 2-1054, respectively.

In addition, the optical system 2-100 may further include a first elastic element 2-106 and a second elastic element 2-110, and the base 2-112 may include four protruding columns 2-1123. The outer portion (the outer ring portion) of the first elastic element 2-106 is fixedly disposed on the top surfaces of the protruding columns 2-1123, the outer portion (the outer ring portion) of the second elastic element 2-110 is fixedly disposed on a plane 2-1125 of each of the protruding columns 2-1123, and the inner portions (the inner ring portions) of the first elastic element 2-106 and the second elastic element 2-110 are respectively connected to the upper and lower sides of the movable assembly 2-MA so that the first movable member 2-1081 to the fourth movable member 2-1084 are suspended in the accommodating space 2-1023.

In this embodiment, the driving module 2-DM may include four driving assemblies (a first driving assembly 2-DA1, a second driving assembly 2-DA2, a third driving assembly 2-DA3, and a fourth driving assembly 2-DA4). The first driving assembly 2-DA1 includes a first driving coil 2-CL1 and a first magnetic element 2-MG1, and the second driving assembly 2-DA2 includes a second driving coil 2-CL2 and a second magnetic element 2-MG2, the third driving assembly 2-DA3 includes a third driving coil 2-CL3 and a third magnetic element 2-MG3, and the fourth driving assembly 2-DA4 includes a fourth driving coil 2-CL4 and a fourth magnetic element 2-MG4.

In this embodiment, each magnetic element has a magnetic surface. For example, as shown in FIG. 2, the first magnetic element 2-MG1 and the second magnetic element 2-MG2 respectively have a first magnetic surface 2-MS1 and a second magnetic surface 2-MS2, the first magnetic surface 2-MS1 faces the first driving coil 2-CL1, the second magnetic surface 2-MS2 faces the second driving coil 2-CL2, and the first magnetic surface 2-MS1 and the second magnetic surface 2-MS2 face different directions.

In this embodiment, as shown in FIG. 2, the frame 2-104 has a plurality of grooves 2-1041 and a central opening 2-1043. In this embodiment, the frame 2-104 has four grooves 2-1041 configured to receive the four magnetic elements, but the number of the grooves 2-1041 and the magnetic elements is not limited to this embodiment. The central opening 2-1043 is configured to accommodate the first driving coil 2-CL1 to the fourth driving coil 2-CL4 and the first movable member 2-1081 to the fourth movable member 2-1084.

In this embodiment, the first driving coil 2-CL1 to the fourth driving coil 2-CL4 may be winding coils, which are respectively disposed on the first movable member 2-1081 to the fourth movable member 2-1084, and when the first driving coil 2-CL1 to the fourth driving coil 2-CL4 are provided with electricity, they can respectively act with the first magnetic element 2-MG1 to the fourth magnetic element 2-MG4 to generate an electromagnetic driving force to drive at least one of the first movable member 2-1081 to the fourth movable member 2-1084 to move relative to the base 2-112 and the frame 2-104 along the optical axis 2-O (the Z-axis) so as to perform functions of auto focusing or optical image stabilization.

The driving assembly of the driving module 2-DM can actuate individually or cooperatively. For example, the first driving assembly 2-DA1 is configured to drive the first movable member 2-1081 to move relative to the fixed assembly 2-FA, and the second driving assembly 2-DA2 is configured to drive the second movable member 2-1082 to move relative to the fixed assembly 2-FA and the first movable member 2-1081, and so on.

Furthermore, as shown in FIG. 2, in this embodiment, the fixed assembly 2-FA may further include at least one circuit member 2-170 configured to be electrically connected to the driving module 2-DM through the first elastic element 2-106 or the second elastic element 2-110. The circuit member 2-170 may be implemented by insert molding technology, but it is not limited thereto. In addition, the circuit member 2-170, the first elastic element 2-106 and the second elastic element 2-110 may constitute a circuit assembly.

Figure 19:
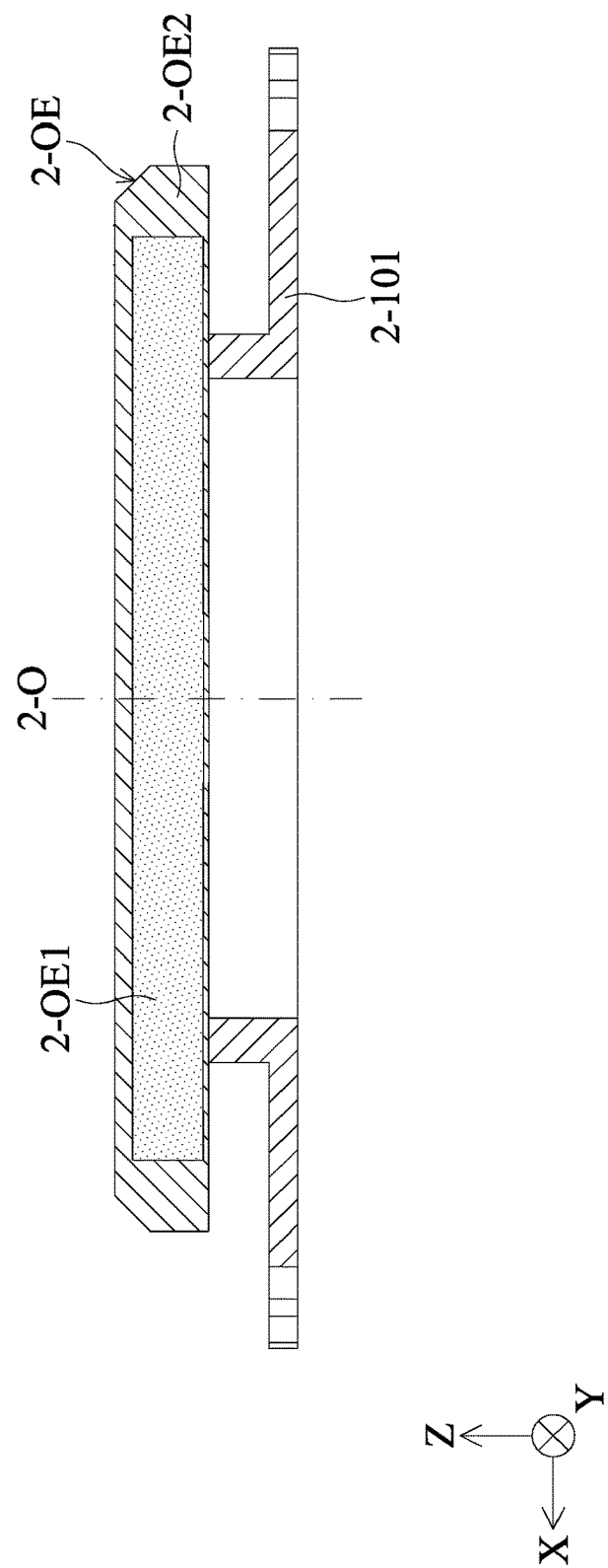
FIG. 19 is a schematic diagram illustrating that the first optical element 2-OE is not pushed by the deforming member 2-101 according to an embodiment of the present disclosure.
Figure 20:
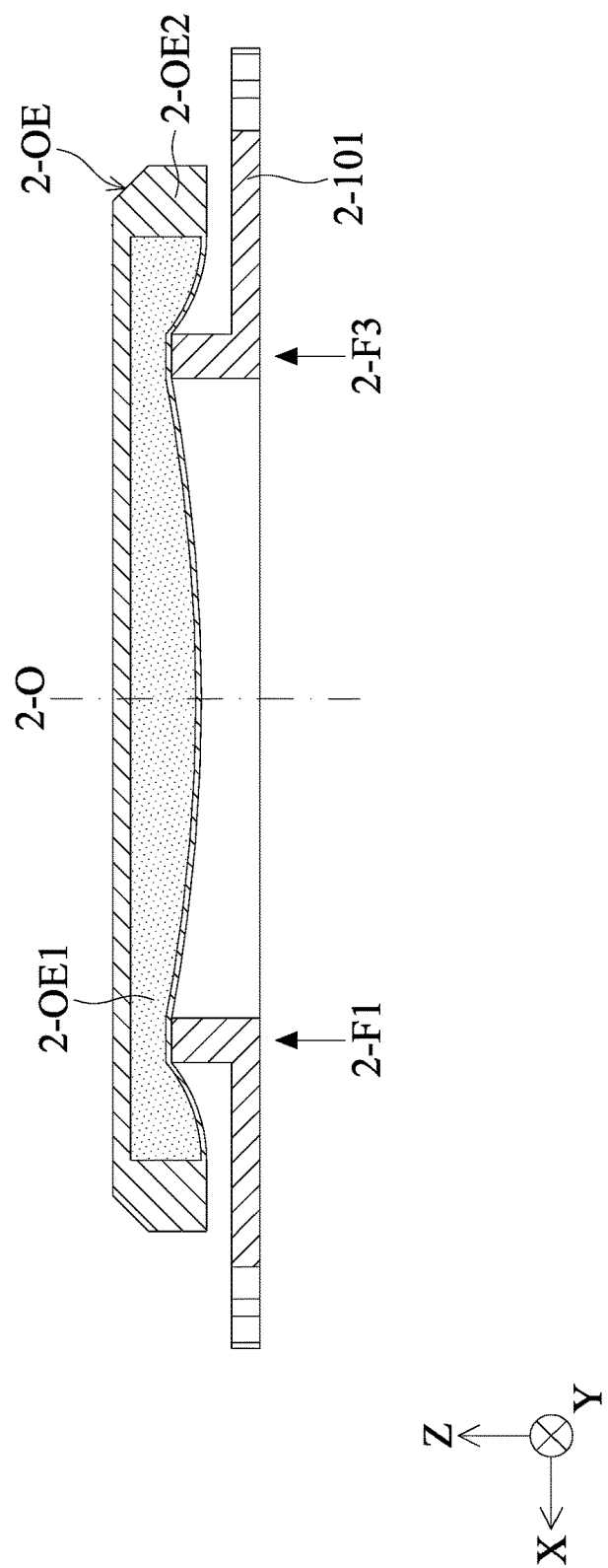
FIG. 20 and FIG. 21 are schematic diagrams of the first optical element 2-OE after being pushed by the deforming member 2-101 according to an embodiment of the present disclosure.
Figure 21:
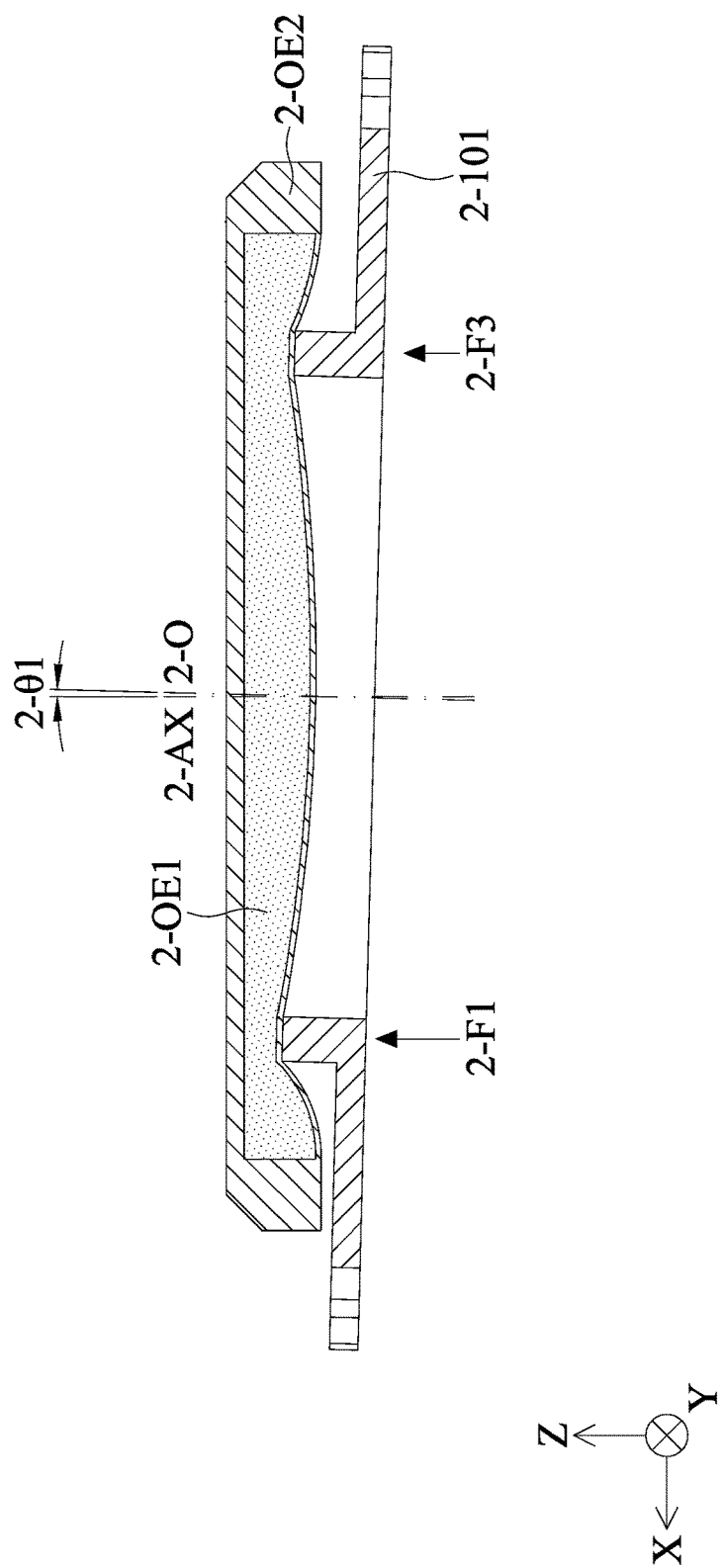

Next, please refer to FIG. 19 to FIG. 21. FIG. 19 is a schematic diagram illustrating that the first optical element 2-OE is not pushed by the deforming member 2-101 according to an embodiment of the present disclosure, and FIG. 20 and FIG. 21 are schematic diagrams of the first optical element 2-OE after being pushed by the deforming member 2-101 according to an embodiment of the present disclosure. As shown in FIG. 19, the first optical element 2-OE may be a liquid lens, including a liquid lens element 2-OE1 and a fixed member 2-OE2. The liquid lens element 2-OE1 is disposed within of the fixed member 2-OE2 having a hollow structure that protects and supports the liquid lens element 2-OE1. The deforming member 2-101 is disposed under the liquid lens element 2-OE1 and the fixed member 2-OE2. The bottom of the fixed member 2-OE2 may be a thin film, so that the deforming member 2-101 may be used for changing the shape of the liquid lens element 2-OE1.

FIG. 19 shows that the liquid lens element 2-OE1 is not deformed and the deforming member 2-101 is in an initial position, and the liquid lens element 2-OE1 has an optical axis 2-O. When the driving module 2-DM drives the movable assembly 2-MA to move, for example, applying a driving current to the driving coils of the driving module 2-DM, a magnetic force is generated between the driving coils and the corresponding magnetic elements, so that the movable assembly 2-MA is driven to move through the magnetic force and to force the deforming member 2-101 though the connecting assembly 2-CA to press the lower side of the liquid lens element 2-OE1. Therefore the liquid lens element 2-OE1 is deformed.

As shown in FIG. 17 and FIG. 20, when the first driving assembly 2-DA1 and the third driving assembly 2-DA3 of the driving module 2-DM provide pushing forces 2-F1, 2-F3 of the same magnitude, the deforming member 2-101 translates along the optical axis 2-O. At this time, the lens curvature of the liquid lens element 2-OE1 is changed from the curvature of the liquid lens element 2-OE1 in FIG. 19. That is, the shape of the liquid lens element 2-OE1 is changed. Therefore, the optical properties of the liquid lens element 2-OE1 can be changed, thereby achieving an optical zoom, focus or shock-proofing effect.

Similarly, referring to FIG. 21, when the driving module 2-DM drives the deforming member 2-101 with a tilted movement, as illustrated in FIG. 21, the deforming member 2-101 obliquely moves and provides an unequal amount of pushing forces 2-F1 and 2-F3 to two different sides of the liquid lens element 2-OE1, so that the optical axis 2-O of the liquid lens element 2-OE1 is rotated and is deviated from the main axis 2-AX. That is, there is an angle 2-O1 formed between them. Therefore, the optical properties of the liquid lens element 2-OE1 are changed, and the optical zoom, focusing or shock-proofing effect can be accomplished.

Figure 22:
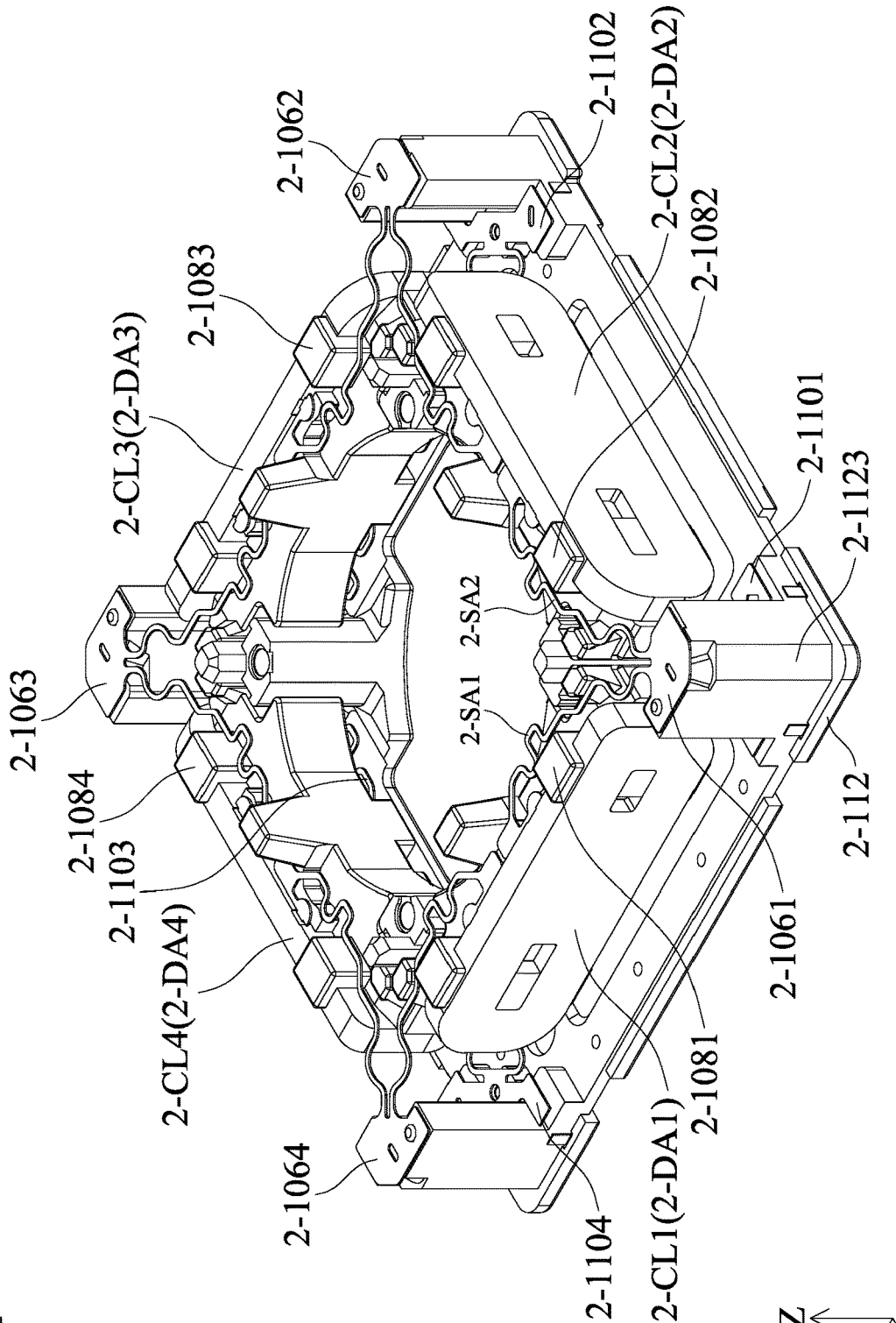
FIG. 22 is a schematic perspective view of a part of the structure of an optical system 2-100A according to another embodiment of the present disclosure.

Next, please refer to FIG. 22, which is a schematic perspective view of a part of the structure of an optical system 2-100A according to another embodiment of the present disclosure. In this embodiment, the first elastic element 2-106 may include four conductive elements 2-1061 to 2-1064, and the second elastic element 2-110 may include four conductive elements 2-1101 to 2-1104.

As shown in FIG. 22, the first driving coil 2-CL1 of the first driving assembly 2-DA1 is electrically connected to the second driving coil 2-CL2 of the second driving assembly 2-DA2 via the conductive element 2-1061 (the first conductive element) of the circuit assembly. Specifically, the conductive element 2-1061 (the first conductive element) has a first string arm 2-SA1 and a second string arm 2-SA2, which are respectively connected to the first driving coil 2-CL1 of the first driving assembly 2-DA1 and the second driving coil 2-CL2 of the second driving assembly 2-DA2.

In addition, the protruding column 2-1123 of the base 2-112 is located between the first driving coil 2-CL1 and the second driving coil 2-CL2, and the conductive element 2-1061 (the first conductive element) is connected to the protruding column 2-1123. For example, the conductive element 2-1061 is fixed to the protruding column 2-1123 by glue or solder.

As shown in FIG. 22, the first driving coil 2-CL1 of the first driving assembly 2-DA1 can also be electrically connected to the second driving coil 2-CL2 of the second driving assembly 2-DA2 via the conductive element 2-1101 (the second conductive element), and the conductive element 2-1061 (the first conductive element) and the conductive element 2-1101 (the second conductive element) are respectively disposed at two sides of the first driving assembly 2-DA1 and the second driving assembly 2-DA2, such as being disposed at the upper side and the lower side of the first driving assembly 2-DA1 and the second driving assembly 2-DA2 in the Z-axis.

Furthermore, the first movable member 2-1081 of the movable assembly 2-MA is movably connected to the protruding column 2-1123 of the fixed assembly 2-FA by the aforementioned first and second conductive elements, but it is not limited thereto. In other embodiments of the present disclosure, the movable assembly 2-MA may also be movably connected to the protruding column 2-1123 of the fixed assembly 2-FA only by the aforementioned first conductive element.

Similarly, the second driving coil 2-CL2 of the second driving assembly 2-DA2 can be electrically connected to the third driving coil 2-CL3 of the third driving assembly 2-DA3 via the conductive element 2-1062 (the third conductive element), and the second driving coil 2-CL2 of the second driving assembly 2-DA2 can also be electrically connected to the third driving coil 2-CL3 of the third driving assembly 2-DA3 via the conductive element 2-1102 (the fourth conductive element). The aforementioned third and fourth conductive elements are respectively disposed at the upper side and the lower side of the second driving assembly 2-DA2 and the third driving assembly 2-DA3 (along the Z-axis).

Figure 23:
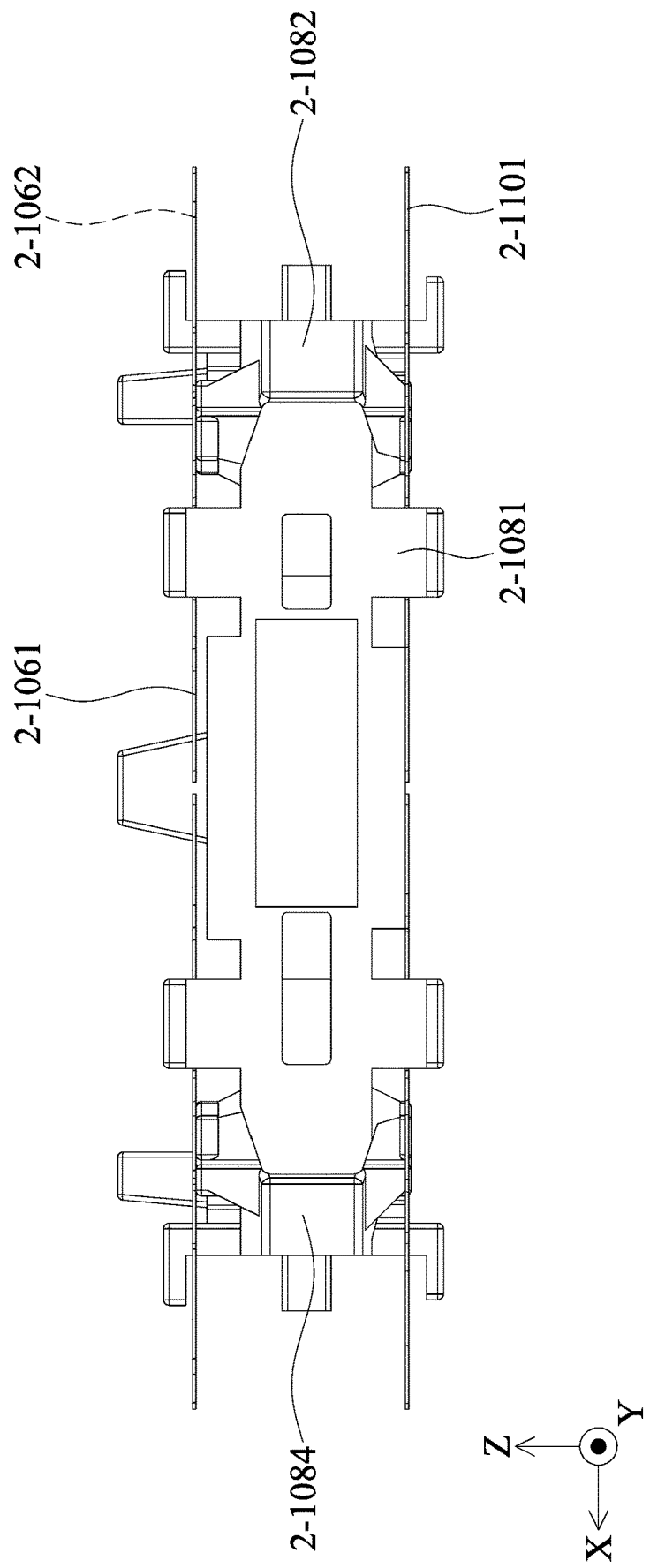
FIG. 23 is a schematic diagram of a partial structure of the optical system 2-100A according to another embodiment of the present disclosure.

Please continue to refer to FIG. 22 and FIG. 23. FIG. 23 is a schematic diagram of a partial structure of the optical system 2-100A according to another embodiment of the present disclosure. The aforementioned conductive elements (such as the first and third conductive elements) all have a plate-shaped structure, and when viewed along an extending direction of the conductive element 2-1061 (such as along the Y-axis), the conductive element 2-1061 (the first conductive element) at least partially overlaps the conductive element 2-1062 (the third conductive element). In this embodiment, the conductive element 2-1061 (the first conductive element) overlaps the conductive element 2-1062 (the third conductive element).

Figure 24:
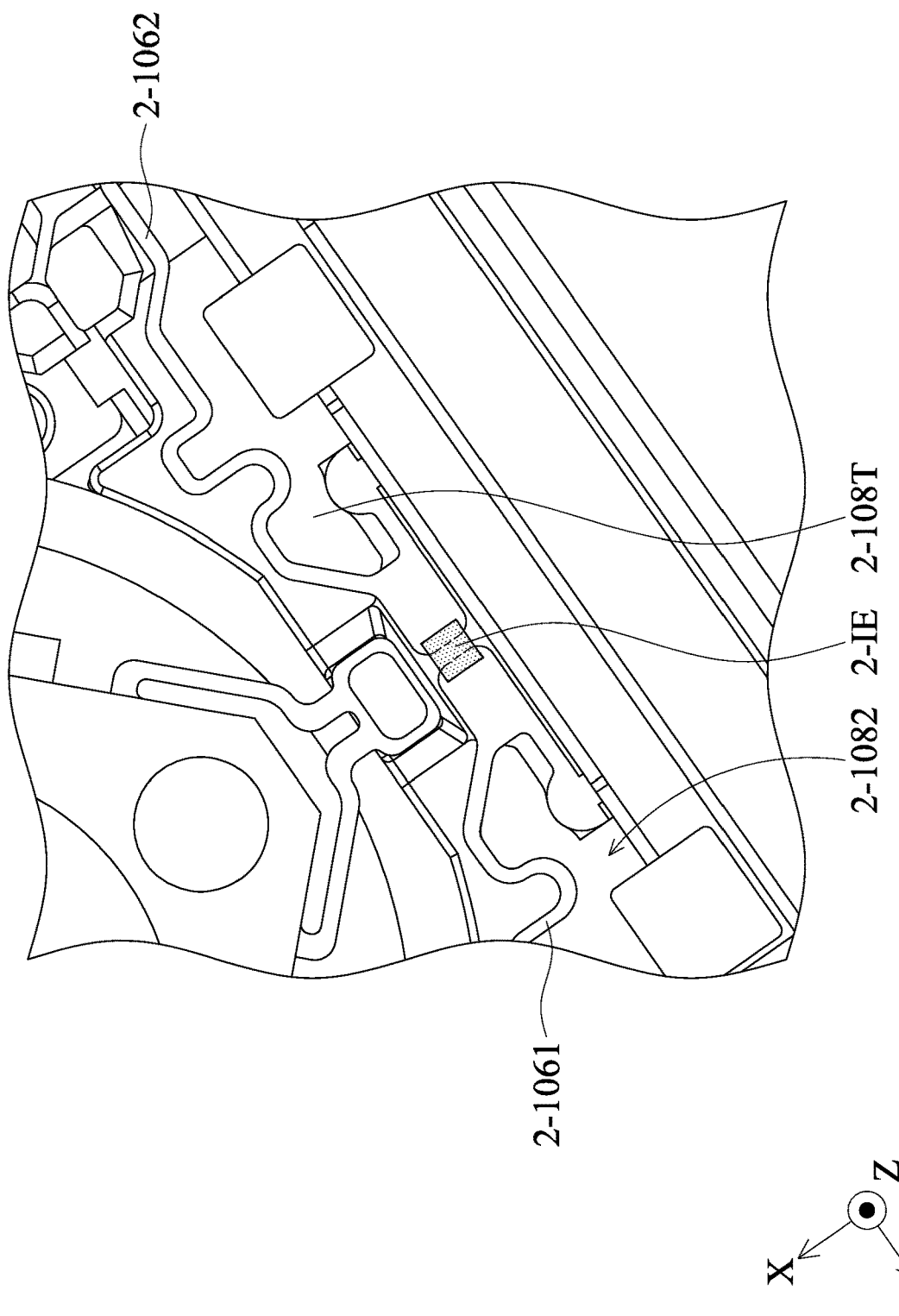
FIG. 24 is an enlarged diagram of a partial structure of the optical system 2-100A according to another embodiment of the present disclosure.

Please refer to FIG. 24, which is an enlarged diagram of a partial structure of the optical system 2-100A according to another embodiment of the present disclosure. The conductive element 2-1061 (the first conductive element) and the conductive element 2-1062 (the third conductive element) are disposed on a top surface 2-108T of the second movable member 2-1082 of the movable assembly 2-MA, and when viewed in the direction of the main axis 2-AX (the Z-axis), the conductive element 2-1061 (the first conductive element) does not overlap the conductive element 2-1062 (the third conductive element).

Furthermore, in this embodiment, the optical system 2-100A may further include an insulating element 2-IE, which is disposed between the conductive element 2-1061 (the first conductive element) and the conductive element 2-1062 (the third conductive element). In this embodiment, the insulating element 2-IE may be a glue configured to connect the conductive element 2-1061 (the first conductive element), the conductive element 2-1062 (the third conductive element), and the second movable member 2-1082 of the movable assembly 2-MA, as shown in FIG. 24. The insulating element 2-IE can be used to fix the end portions of the conductive element 2-1061 (the first conductive element) and the conductive element 2-1062 (the third conductive element) to the second movable member 2-1082, and it can cause the conductive element 6-1061 (the first conductive element) being electrically independent from the conductive element 2-1062 (the third conductive element).

Figure 25:
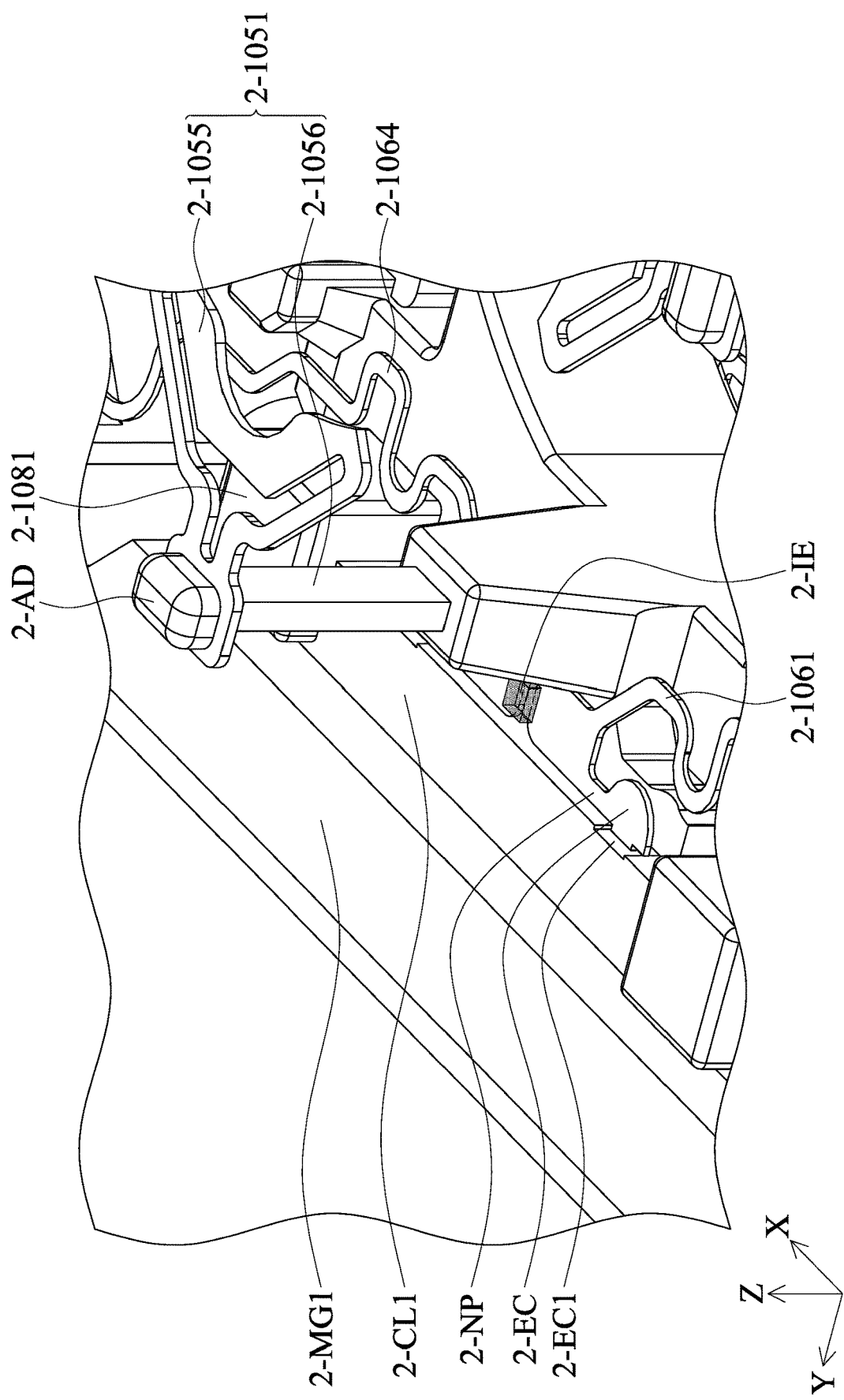
FIG. 25 is an enlarged diagram of a part of the structure of the optical system 2-100A in another view according to another embodiment of the present disclosure.

Please refer to FIG. 25, which is an enlarged diagram of a part of the structure of the optical system 2-100A in another view according to another embodiment of the present disclosure. The optical system 2-100A is similar to the optical system 2-100. The difference between them is that each connecting member of the optical system 2-100A can have an elastic portion and a rigid portion. For example, the first connecting member 2-1051 may have an elastic portion 2-1055 and a rigid portion 2-1056, and the rigid portion 2-1056 is connected to the elastic portion 2-1055 by an adhesive member 2-AD. The rigid portion 2-1056 is connected between the elastic portion 2-1055 and the first movable member 2-1081.

Furthermore, as shown in FIG. 25, the conductive element 2-1061 (the first conductive element) has an electrical contact 2-EC and a narrow portion 2-NP. The electrical contact 2-EC is configured to be electrically connected to an electrical contact 2-EC1 of the first driving coil 2-CL1 of the first driving assembly 2-DA1, for example, by welding. The narrow portion 2-NP is adjacent to the electrical contact 2-EC, and the design of the narrow portion 2-NP can reduce the heat transfer during welding to prevent the first movable member 2-1081 from being damaged and can allow the thermal energy to be concentrated on the electrical contact 2-EC so as to facilitate melt of the solder more reliably, so that the solder can be set more securely.

Figure 26:
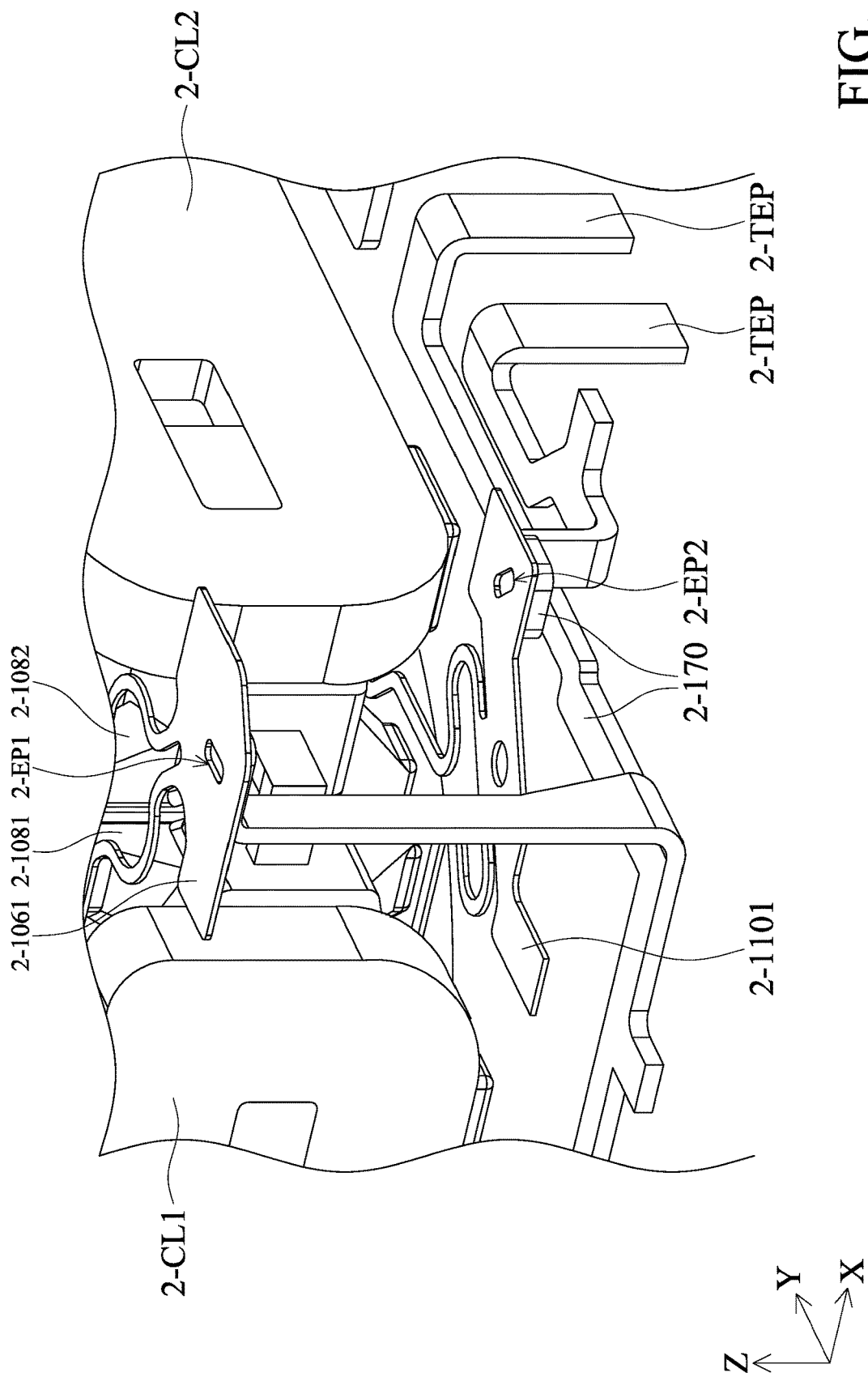
FIG. 26 is an enlarged diagram of the optical system 2-100A after removing the base 2-112 according to an embodiment of the present disclosure.

Please refer to FIG. 26, which is an enlarged diagram of the optical system 2-100A after removing the base 2-112 according to an embodiment of the present disclosure. In this embodiment, the conductive element 2-1061 (the first conductive element) and the conductive element 2-1101 (the second conductive element) can be electrically connected to an external electrical connection portion 2-TEP through the circuit member 2-170 which is embedded in the base 2-112, for example, by welding.

Specifically, as shown in FIG. 26, the conductive element 2-1061 (the first conductive element) is electrically connected to the circuit member 2-170 through a first electrical connecting point 2-EP1, and the conductive element 2-1101 (the second conductive element) is electrically connected to the circuit member 2-170 through a second electrical connecting point 2-EP2. In addition, the shortest distance between the first electrical connecting point 2-EP1 and the first optical element 2-OE is different from the shortest distance between the second electrical connecting point 2-EP2 and the first optical element 2-OE. That is, the distance between the first electrical connecting point 2-EP1 and the first optical element 2-OE along the main axis 2-AX is smaller than the distance between the second electrical connecting point 2-EP2 and the first optical element 2-OE.

Figure 27:
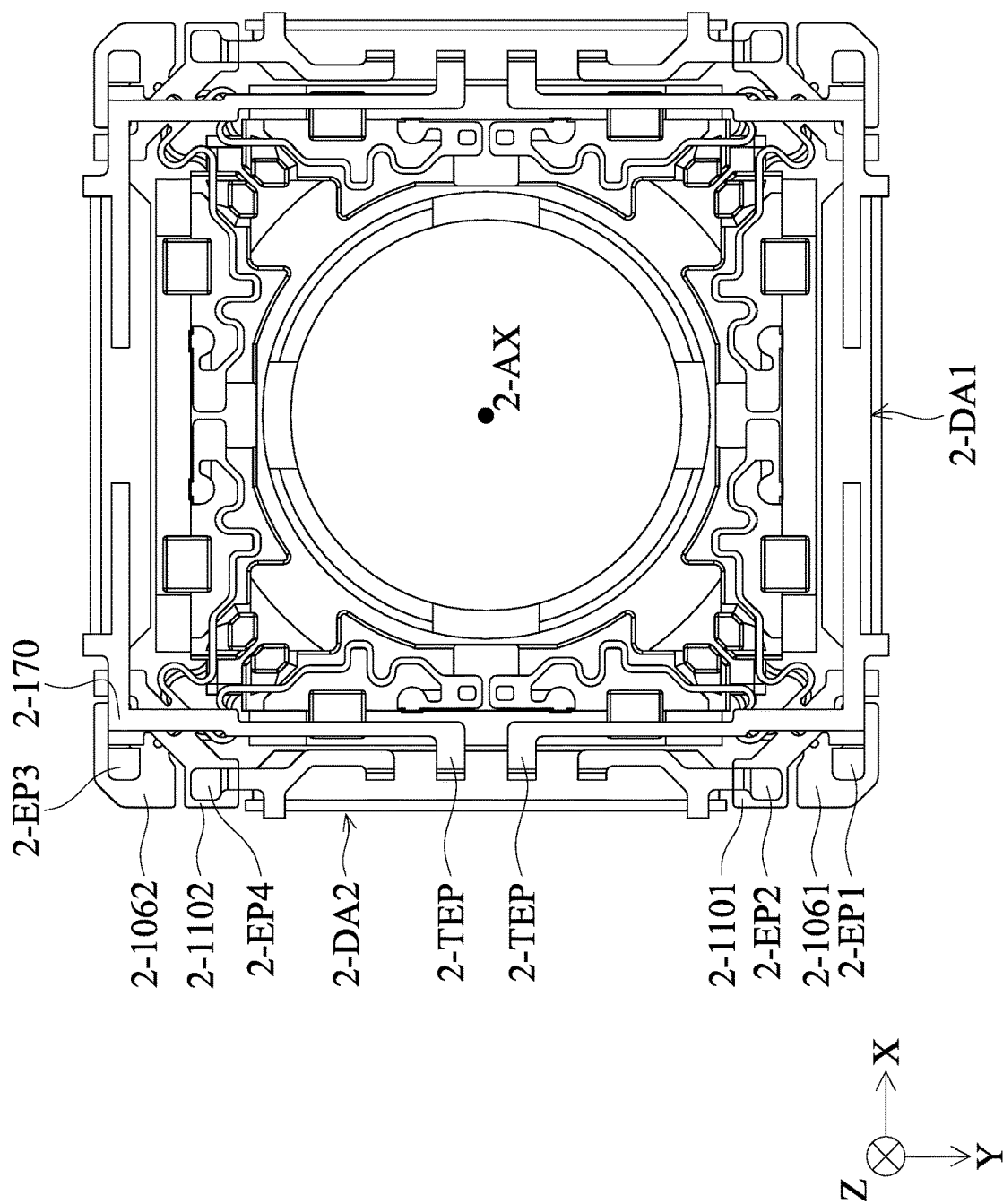
FIG. 27 is a bottom view of the of the optical system 2-100A after removing the base 2-112 according to another embodiment of the present disclosure.

Next, please refer to FIG. 27, which is a bottom view of the of the optical system 2-100A after removing the base 2-112 according to another embodiment of the present disclosure. When viewed along the main axis 2-AX, the second driving assembly 2-DA2 overlaps the external electrical connection portion 2-TEP, and the first driving assembly 2-DA1 does not overlap the external electrical connection portion 2-TEP. The external electrical connection portion 2-TEP is a pin exposed from the base 2-112.

In this embodiment, the circuit member 2-170 may constitute a polygonal structure, such as a rectangular structure in FIG. 27. Furthermore, the conductive element 2-1062 (the third conductive element) is electrically connected to the circuit member 2-170 through a third electrical connecting point 2-EP3, the conductive element 2-1102 (the fourth conductive element) is electrically connected to the circuit member 2-170 through a fourth electrical connecting point 2-EP4, and the aforementioned second electrical connecting point 2-EP2 and the fourth electrical connecting point 2-EP4 are disposed on one side of the circuit member 2-170, such as on the left.

It should be noted that when viewed along the main axis 2-AX, the aforementioned second electrical connecting point 2-EP2 and the fourth electrical connecting point 2-EP4 are located between the aforementioned first electrical connecting point 2-EP1 and the third electrical connecting point 2-EP3.

Figure 28:
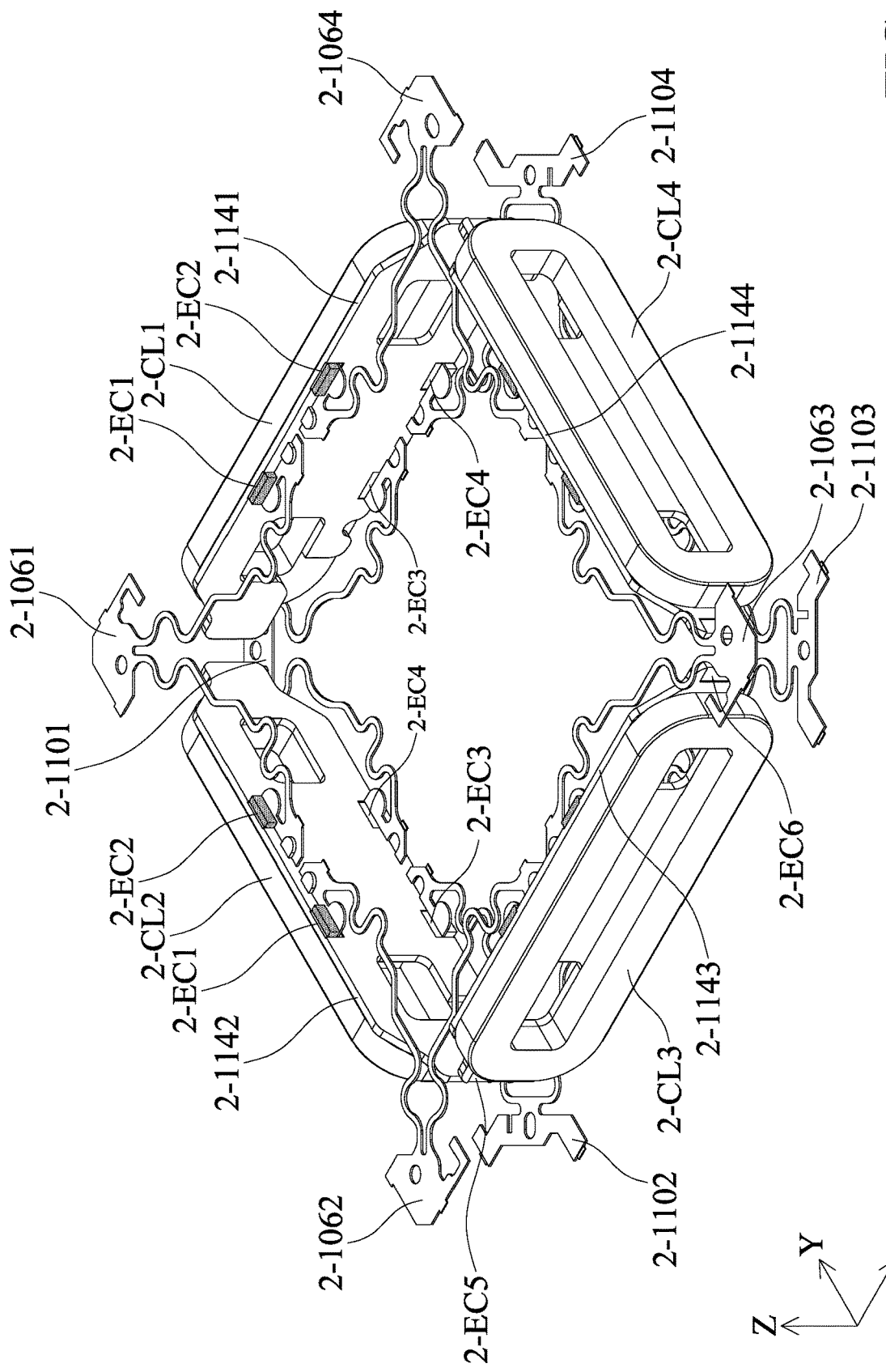
FIG. 28 is a schematic diagram of a part of a structure of an optical system according to another embodiment of the present disclosure.

Please refer to FIG. 28, which is a schematic diagram of a part of a structure of an optical system according to another embodiment of the present disclosure. In this embodiment, each driving assembly may further include a flexible circuit board. For example, the first driving assembly 2-DA1 to the fourth driving assembly 2-DA4 may have circuit boards 2-1141 to 2-1144 respectively, and each circuit board may have six electrical contacts 2-EC1 to 2-EC6.

In this embodiment, the electrical contact 2-EC1 and the electrical contact 2-EC2 of the circuit board 2-1141 are electrically connected to a positive voltage and a negative voltage, respectively. The electrical contact 2-EC3 and the electrical contact 2-EC4 of the circuit board 2-1141 are electrically connected to a data signal and a clock signal, respectively, and the electrical contact 2-EC5 and the electrical contact 2-EC6 respectively output a first output signal and a second output signal.

Because the circuit board 2-1141 and the circuit board 2-1142 share the conductive element 2-1061 and the conductive element 2-1101, the electrical contact 2-EC2 of the circuit board 2-1142 is electrically connected to the positive voltage, and the electrical contact 2-EC4 of the circuit board 2-1142 is electrically connected to the data signal. Similarly, because the circuit board 2-1142 and the circuit board 2-1143 share the conductive element 2-1062 and the conductive element 2-1102, the electrical contact 2-EC1 of the circuit board 2-1142 is electrically connected to the negative voltage. The electrical contact 2-EC3 of the circuit board 2-1142 is electrically connected to the clock signal, and the electrical contact 2-EC5 and the electrical contact 2-EC6 of the circuit board 2-1142 respectively output the second output signal and the first output signal.

That is, the circuit layout of the circuit board 2-1141 (the first circuit element) is different from the circuit layout of the circuit board 2-1142 (the second circuit element). For example, the circuit layout of the circuit board 2-1141 is symmetrical to the circuit layout of the circuit board 2-1142.

The present disclosure provides an optical system having a first optical element 2-OE, a deforming member 2-101, a movable element 2-103, a fixed assembly 2-FA, a connecting assembly 2-CA, a movable assembly 2-MA, and a driving module 2-DM. The movable element 2-103 is configured to be connected to the first optical element 2-OE through the deforming member 2-101, and the movable assembly 2-MA is connected to the movable element 2-103 through the connecting assembly 2-CA. When driving module 2-DM is configured to drive movable assembly 2-MA to move relative to fixed assembly 2-FA, the movable element 2-103 can be moved to drive the deforming member 2-101 to push the bottom of first optical element 2-OE, thereby changing the optical properties of the liquid lens element 2-OE1.

In addition, the circuit layouts of adjacent circuit boards in the driving assembly are symmetrical, and adjacent movable members in movable assembly 2-MA can share conductive elements, so that the optical system of the present disclosure can achieve simplified mechanism design and the purpose of miniaturization.

The Third Embodiment Group

Figure 29:
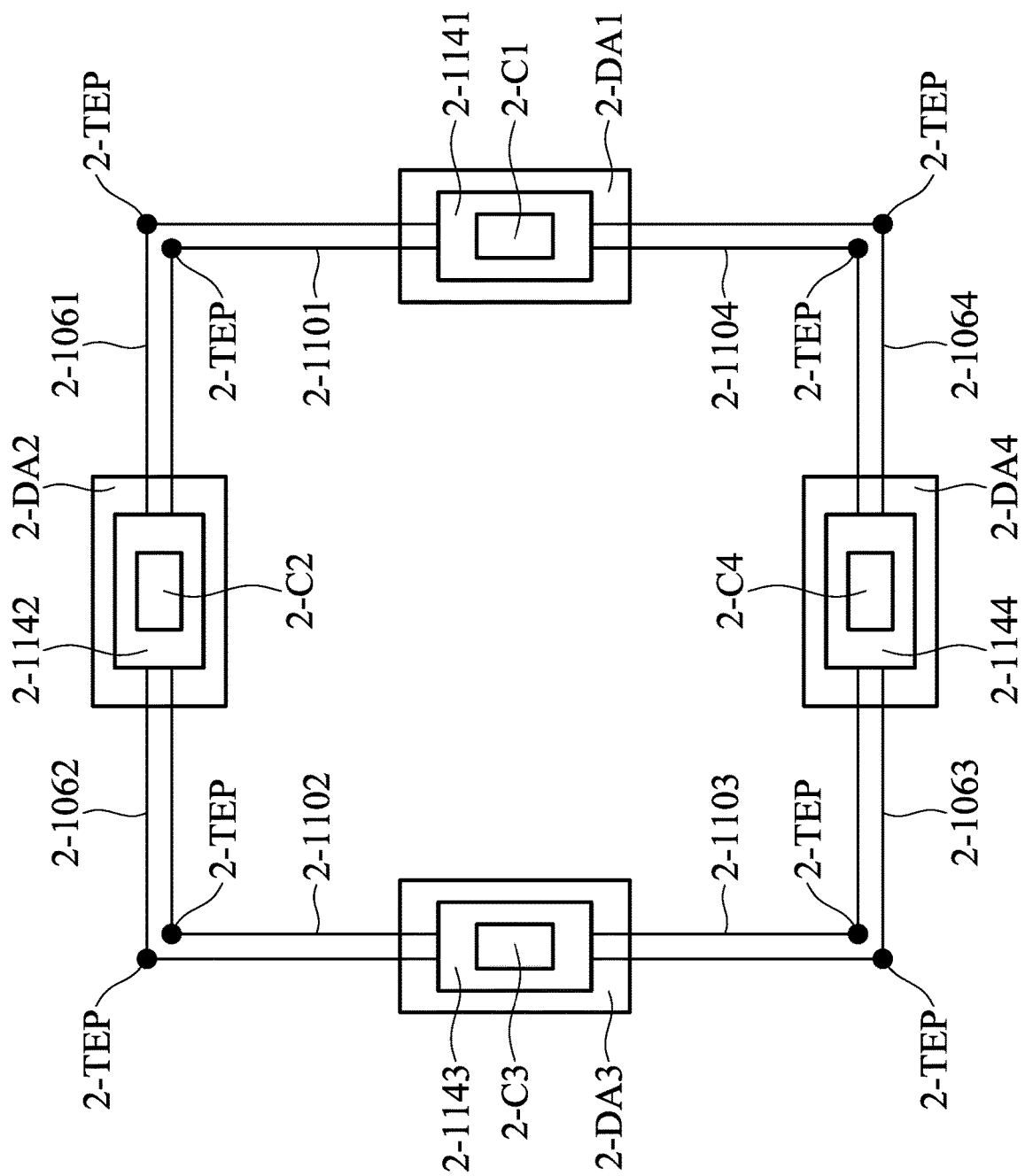
FIG. 29 is a perspective diagram showing the eight conductive elements 2-1061 to 2-1064 and 2-1101 to 2-1104 electrically connected to the circuit boards 2-1141 to 2-1144 of the four driving assemblies 2-DA1 to 2-DA4.

FIG. 29 is a perspective diagram showing the eight conductive elements 2-1061 to 2-1064 and 2-1101 to 2-1104 electrically connected to the circuit boards 2-1141 to 2-1144 of the four driving assemblies 2-DA1 to 2-DA4.

Referring to FIGS. 22, 28 and 29, the eight conductive elements 2-1061 to 2-1064 and 2-1101 to 2-1104 may be resilient metal spring sheets that electrically connect to the circuit boards 2-1141 to 2-1144 of the four driving assemblies 2-DA1 to 2-DA4. Here, the two conductive elements 2-1061, 2-1101 are electrically connected to 2-1141, 2-1142, the two conductive elements 2-1062, 2-1102 are electrically connected to the circuit boards 2-1142, 2-1143, the two conductive elements 2-1063, 2-1103 are electrically connected to the circuit boards 2-1143, 2-1144, and the two conductive elements 2-1064, 2-1104 are electrically connected to the circuit boards 2-1144, 2-1141. It should be noted that the eight conductive elements 2-1061 to 2-1064 and 2-1101 to 2-1104 further electrically connect to an external circuit via the external electrical connection portions 2-TEP that are exposed to the surface of the base 2-112.

The circuit boards 2-1141 to 2-1144 are respectively affixed to the movable members 2-1081 to 2-1084, and four control circuit elements 2-C1 to 2-C4 are disposed on the circuit boards 2-1141 to 2-1144, as shown in FIG. 29. Moreover, the movable members 2-1081 to 2-1084 are spaced apart from each other in a horizontal direction substantially parallel to the XY plane (FIG. 22), wherein the horizontal direction and the main axis 2-AX form an included angle, and each of the movable members 2-1081 to 2-1084 can be driven to move relative to the fixed assembly 2-FA and the other movable members.

In this embodiment, the control circuit element 2-C1 (first control circuit element) on the circuit board 2-1141 can transmit a first driving signal to the driving assembly 2-DA1 in a first time interval for driving the movable member 2-1081 to move relative to the fixed assembly 2-FA, and the conductive element 2-1061 is electrically connected to the control circuit element 2-C1 via the circuit board 2-1141.

Similarly, the control circuit element 2-C2 (second control circuit element) on the circuit board 2-1142 can transmit a second driving signal to the driving assembly 2-DA2 in a second time interval for driving the movable member 2-1082 to move relative to the fixed assembly 2-FA, and the conductive element 2-1062 is electrically connected to the control circuit element 2-C2 via the circuit board 2-1142.

Similarly, the control circuit element 2-C3 (third control circuit element) on the circuit board 2-1143 can transmit a third driving signal to the driving assembly 2-DA3 in a third time interval for driving the movable member 2-1083 to move relative to the fixed assembly 2-FA, and the conductive element 2-1063 is electrically connected to the control circuit element 2-C3 via the circuit board 2-1143.

Similarly, the control circuit element 2-C4 (fourth control circuit element) on the circuit board 2-1144 can transmit a fourth driving signal to the driving assembly 2-DA4 in a fourth time interval for driving the movable member 2-1084 to move relative to the fixed assembly 2-FA, and the conductive element 2-1064 is electrically connected to the control circuit element 2-C4 via the circuit board 2-1144. In some embodiments, the control circuit elements 2-C1 to 2-C4 may comprise a microcontroller unit (MCU), Hall effect sensor or other IC component.

As shown in FIGS. 22, 28 and 29, the optical system has a substantially rectangular configuration, wherein the driving assemblies 2-DA1 and 2-DA3 are arranged on two opposite sides of the optical system, and the driving assemblies 2-DA2 and 2-DA4 are arranged on the other two opposite sides of the optical system. Moreover, the two driving assemblies 2-DA1 and 2-DA2 are arranged on the adjacent sides of the optical system, the two driving assemblies 2-DA2 and 2-DA3 are arranged on the adjacent sides of the optical system, the two driving assemblies 2-DA3 and 2-DA4 are arranged on the adjacent sides of the optical system, and the two driving assemblies 2-DA4 and 2-DA1 are arranged on the adjacent sides of the optical system.

It should be noted that electrical current signals can be applied to the driving assemblies 2-DA1 to 2-DA4 via the conductive elements 2-1061 to 2-1064 and 2-1101 to 2-1104 from an external circuit, thus driving the movable members 2-1081 to 2-1084 to move relative to the fixed assembly 2-FA. However, since the adjacent driving assemblies 2-DA1 and 2-DA2 share the conductive elements 2-1061 and 2-1101 in common, the conductive elements 2-1061 and 2-1101 cannot be used at the same time to energize the driving assemblies 2-DA1 and 2-DA2 for simultaneously driving the movable members 2-1081 to 2-1082 to move.

For the same reasons as described above, the driving assemblies 2-DA2 and 2-DA3 cannot drive the movable members 2-1082 to 2-1083 to move at the same time, the driving assemblies 2-DA3 and 2-DA4 cannot drive the movable members 2-1083 to 2-1084 to move at the same time, and the driving assemblies 2-DA4 and 2-DA1 cannot drive the movable members 2-1084 to 2-1081 to move at the same time.

Figure 30:
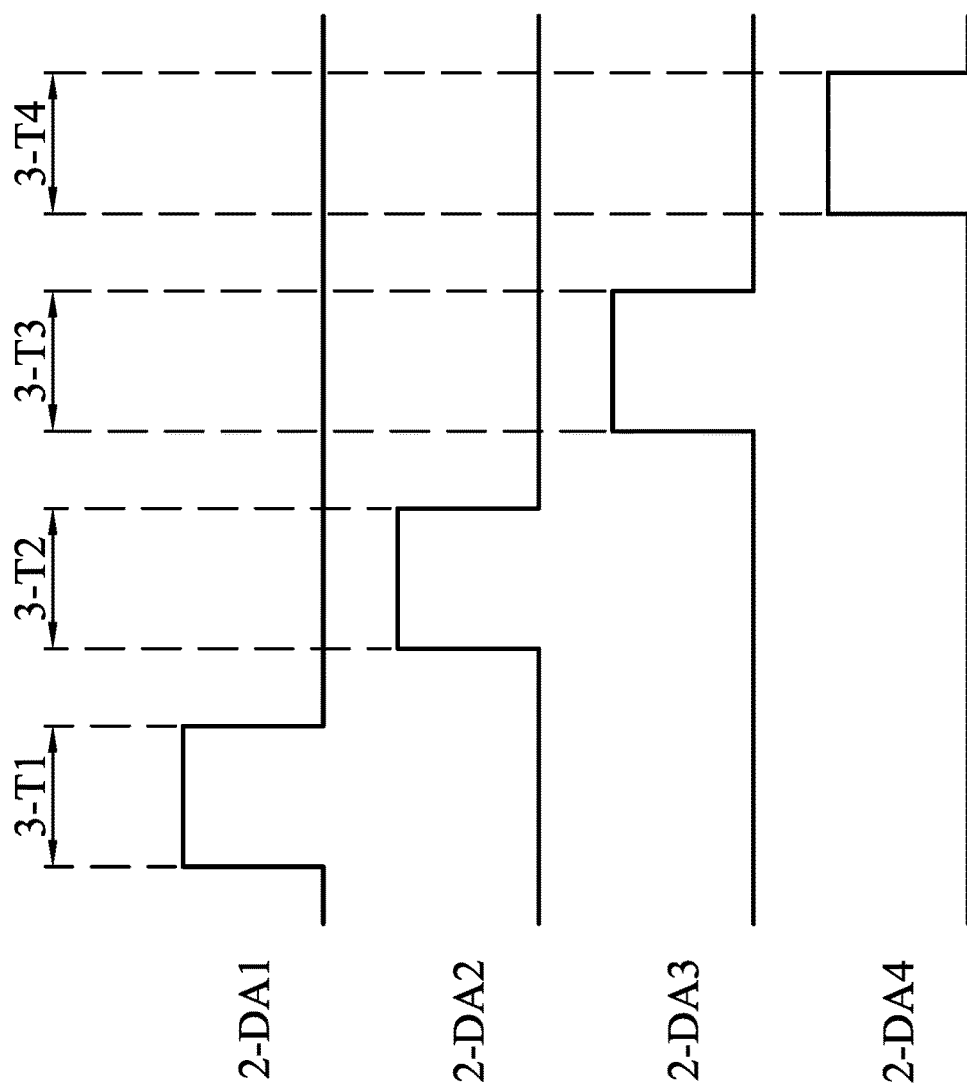
FIG. 30 is a sequence diagram showing the four driving assemblies 2-DA1 to 2-DA4 sequentially drive the movable members 2-1081 to 2-1084 to move relative to the fixed assembly 2-FA in different time intervals 3-T1 to 3-T4.

Referring to FIGS. 29 and 30, FIG. 30 is a sequence diagram showing the four driving assemblies 2-DA1 to 2-DA4 sequentially drive the movable members 2-1081 to 2-1084 to move relative to the fixed assembly 2-FA in different time intervals 3-T1 to 3-T4. To overcome the problem that the adjacent driving assemblies may commonly share the same conductive elements to communicate with the external circuit, as show in FIG. 30, the four driving assemblies 2-DA1 to 2-DA4 in this embodiment can respectively drive the movable members 2-1081 to 2-1084 to move relative to the fixed assembly 2-FA in a first time interval 3-T1, a second time interval 3-T2, a third time interval 3-T3, and a four time interval 3-T4. Hence, the external circuit can transmit electrical current signals through the same conductive elements to different driving assemblies in different time intervals. Thus, the movable assembly 2-MA, the movable element 2-103, and the deforming member 2-101 can be driven to move, and the optical axis 2-O of the liquid lens element 2-OE1 can be effectively adjusted.

Figure 31:
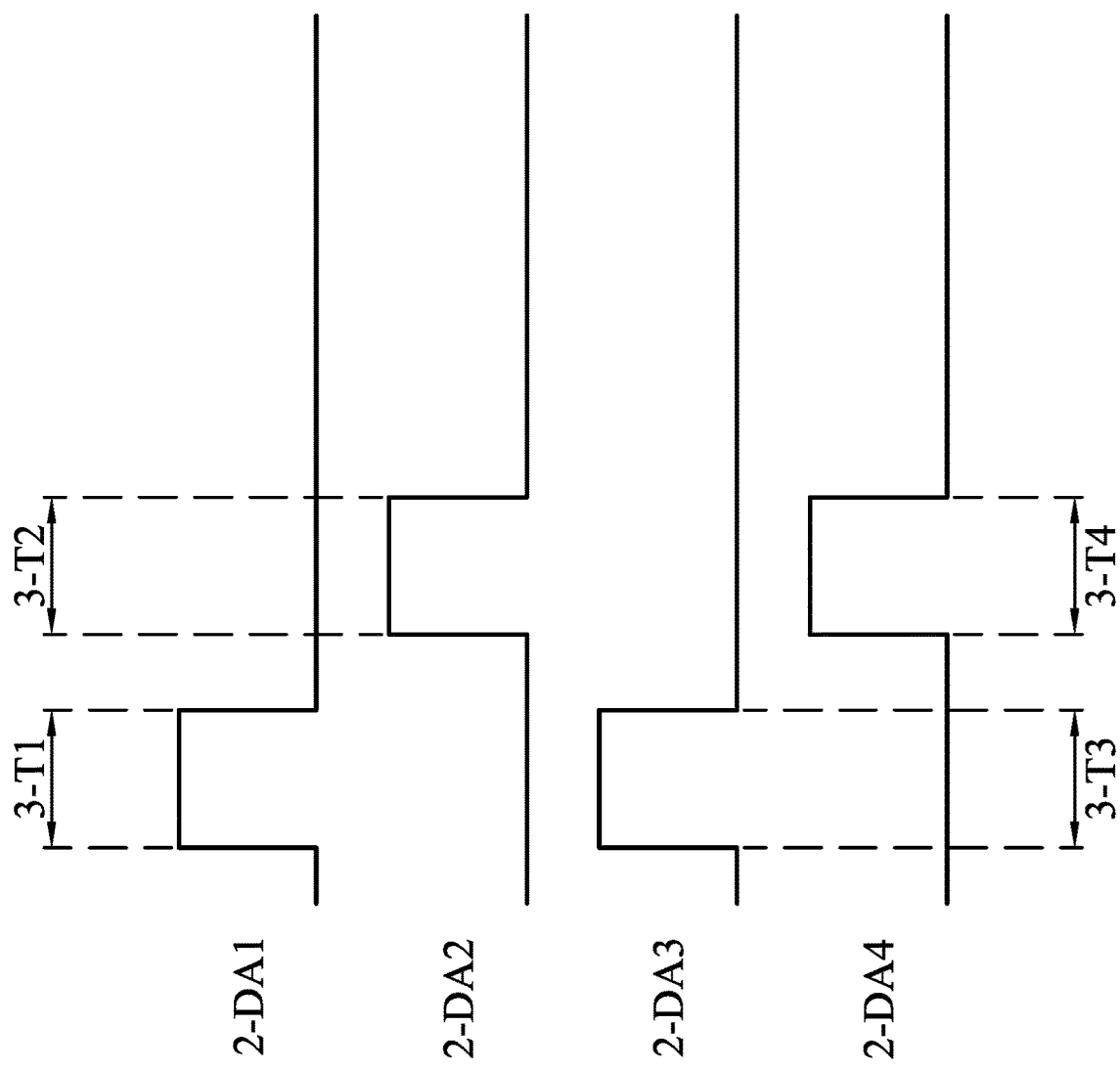
FIG. 31 is a sequence diagram showing the driving assemblies 2-DA1 and 2-DA3 respectively drive the movable member 2-1081 and 2-1083 to move relative to the fixed assembly 2-FA in the same time interval, and the driving assemblies 2-DA2 and 2-DA4 respectively drive the movable member 2-1082 and 2-1084 to move relative to the fixed assembly 2-FA in the same time interval.

FIG. 31 is a sequence diagram showing the driving assemblies 2-DA1 and 2-DA3 respectively drive the movable member 2-1081 and 2-1083 to move relative to the fixed assembly 2-FA in the same time interval, and the driving assemblies 2-DA2 and 2-DA4 respectively drive the movable member 2-1082 and 2-1084 to move relative to the fixed assembly 2-FA in the same time interval. As shown in FIG. 29, since the driving assemblies 2-DA1 and 2-DA3 do not share the same conductive elements in common, they can drive the movable members 2-1081 and 2-1083 to move relative to the fixed assembly 2-FA in the same time interval. Similarly, since the driving assemblies 2-DA2 and 2-DA4 do not share the same conductive elements in common, they can also drive the movable member 2-1082 and 2-1084 to move relative to the fixed assembly 2-FA in the same time interval. That is, the first time interval 3-T1 could be the same as the third time interval 3-T3, and the second time interval 3-T2 could also be the same as the fourth time interval 3-T4, whereby the time for driving the movable assembly 2-MA can be reduced, and the efficiency of the optical system 2-100 and the driving module 2-DM thereof can be greatly improved. Furthermore, miniaturization of the optical system 2-100 can also be achieved.

Figure 32:
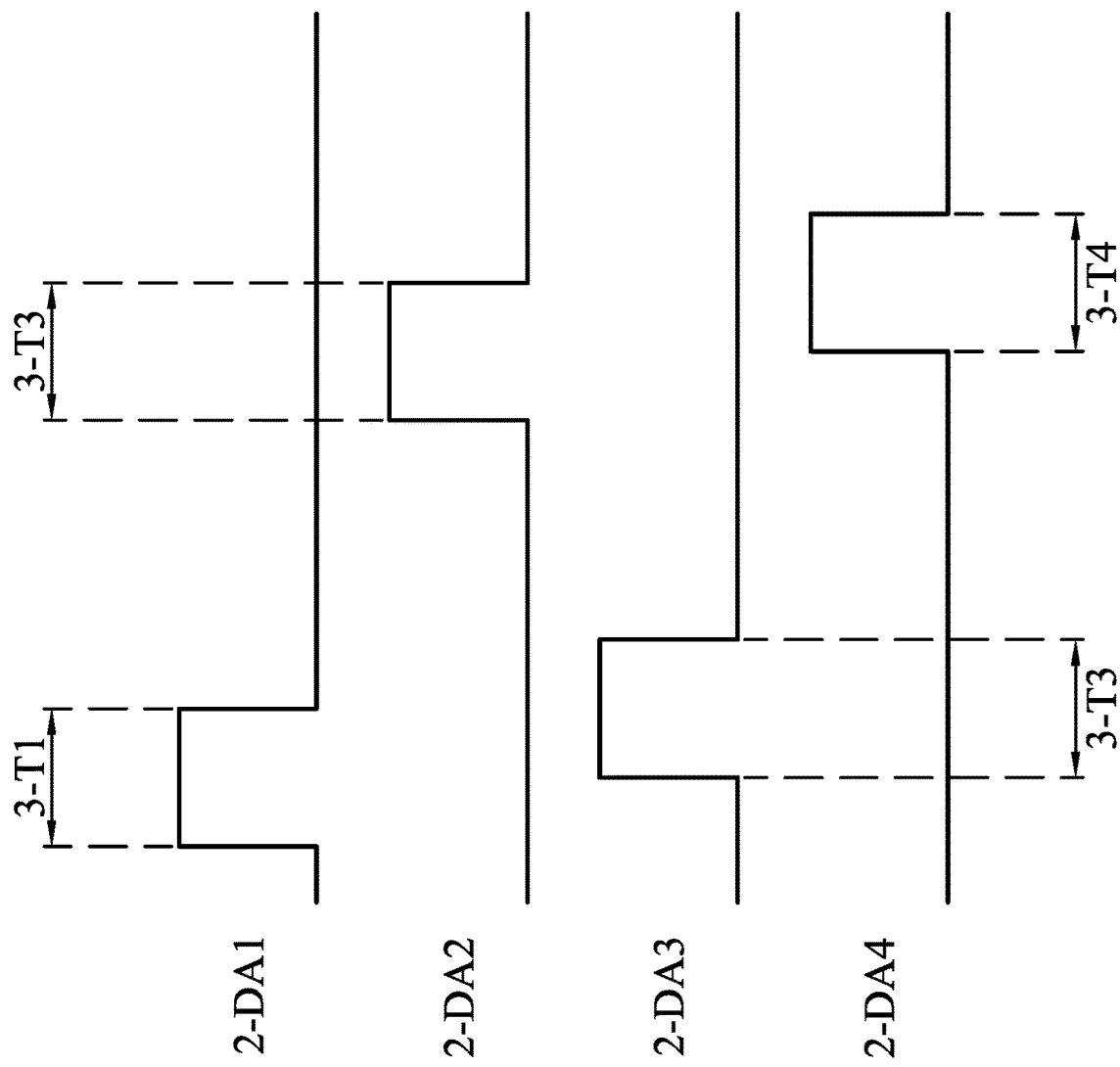
FIG. 32 is a sequence diagram showing the driving assemblies 2-DA1 to 2-DA4 respectively drive the movable member 2-1081 and 2-1084 to move relative to the fixed assembly 2-FA in different time intervals 3-T1 to 3-T4.

FIG. 32 is a sequence diagram showing the driving assemblies 2-DA1 to 2-DA4 respectively drive the movable member 2-1081 and 2-1084 to move relative to the fixed assembly 2-FA in different time intervals 3-T1 to 3-T4. In another embodiment of FIG. 32, the first time interval 3-T1 and the third time interval 3-T3 may partially overlap, and the second time interval 3-T2 and the fourth time interval 3-T4 may also partially overlap, so as to overcome the problem that the adjacent driving assemblies commonly share the same conductive elements.

In the aforementioned embodiments, since the driving assemblies on the adjacent sides of the optical system share the same conductive elements in common, when the driving assemblies 2-DA1 and 2-DA3 drive the movable member 2-1081 and 2-1083 to move relative to the fixed assembly 2-FA, the driving assemblies 2-DA2 and 2-DA4 do not drive the movable member 2-1082 and 2-1084 to move relative to the fixed assembly 2-FA. For the same reasons as described above, when the driving assemblies 2-DA2 and 2-DA4 drive the movable member 2-1082 and 2-1084 to move relative to the fixed assembly 2-FA, the driving assemblies 2-DA1 and 2-DA3 do not drive the movable member 2-1081 and 2-1083 to move relative to the fixed assembly 2-FA.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical system, comprising:
a fixed assembly, defining a main axis;
a first movable member, connected to an optical element and movable relative to the fixed assembly;
a second movable member, connected the an optical element and movable relative to the fixed assembly;
a first driving assembly, connected to the first movable member for driving the first movable member to move relative to the fixed assembly; and
a second driving assembly, connected to the second movable member for driving the second movable member to move relative to the fixed assembly;
wherein the first driving assembly drives the first movable member to move relative to the fixed assembly in a first time interval, and the second driving assembly drives the second movable member to move relative to the fixed assembly in a second time interval, wherein the second driving assembly does not drive the second movable member to move relative to the fixed assembly when the first driving assembly drives the first movable member to move relative to the fixed assembly.

2. The optical system as claimed in claim 1, wherein the first and second driving assemblies respectively drive the first and second movable members to move relative to the fixed assembly along the main axis, and the first and second movable members are spaced apart from each other in a horizontal direction, wherein the horizontal direction and the main axis form an included angle.

3. The optical system as claimed in claim 2, wherein the horizontal direction is perpendicular to the main axis.

4. The optical system as claimed in claim 3, wherein the second movable member is movable relative to the fixed assembly and the first movable member.

5. The optical system as claimed in claim 1, further comprising a third driving assembly and a third movable member, wherein the third movable member is connected to the optical element and movable relative to the fixed assembly, and the third driving assembly drives the third movable member to move relative to the fixed assembly in a third time interval, wherein the first and third time intervals at least partially overlap.

6. The optical system as claimed in claim 5, wherein when the second driving assembly drives the second movable member to move relative to the fixed assembly, the third driving assembly does not drive the third movable member to move relative to the fixed assembly.

7. The optical system as claimed in claim 1, further comprising a third driving assembly and a third movable member, wherein the third movable member is connected to the optical element and movable relative to the fixed assembly, and the third driving assembly drives the third movable member to move relative to the fixed assembly in a third time interval, wherein the first and third time intervals do not overlap.

8. The optical system as claimed in claim 7, wherein when the second driving assembly drives the second movable member to move relative to the fixed assembly, the third driving assembly does not drive the third movable member to move relative to the fixed assembly.

9. The optical system as claimed in claim 1, further comprising a first conductive element electrically connected to the first and second driving assembles.

10. The optical system as claimed in claim 9, further comprising a first control circuit element connected to the first movable member, wherein the first control circuit element transmits a first driving signal to the first driving assembly in the first time interval for driving the first movable member to move relative to the fixed assembly, and the first conductive element is electrically connected to the first control circuit element.

11. The optical system as claimed in claim 10, further comprising a second control circuit element connected to the second movable member, wherein the second control circuit element transmits a second driving signal to the second driving assembly in the second time interval for driving the second movable member to move relative to the fixed assembly, and the first conductive element is electrically connected to the first and second control circuit elements.

12. The optical system as claimed in claim 10, wherein the first control circuit element comprises a microcontroller unit.

13. The optical system as claimed in claim 9, further comprising a second conductive element electrically connected to the first and second driving assembles, wherein the first and second conductive elements at least partially overlap when viewed in a direction parallel to the main axis.

14. The optical system as claimed in claim 9, further comprising a third conductive element, a third movable member, and a third driving assembly for driving the third movable member to move relative to the fixed assembly, wherein the third movable member is connected to the optical element and the third driving assembly, and the third conductive element is electrically connected to the second and third driving assemblies.

15. The optical system as claimed in claim 14, further comprising a third control circuit element connected to the third movable member, wherein the third control circuit element transmits a third driving signal to the third driving assembly in a third time interval for driving the third movable member to move relative to the fixed assembly, wherein the third conductive element is electrically connected to the third control circuit element.

16. The optical system as claimed in claim 14, wherein the first, second, and third conductive elements are resilient metal spring sheets.

17. The optical system as claimed in claim 14, wherein the first and third driving assemblies are located on opposite sides of the optical system.

18. The optical system as claimed in claim 17, wherein the first and second driving assemblies are located on adjacent sides of the optical system.

19. The optical system as claimed in claim 1, wherein the first driving assembly comprises a coil and a magnetic element.

20. The optical system as claimed in claim 1, wherein the coil is disposed on the first movable member, and the magnetic element is disposed on the fixed assembly.

* * * * *